United States Patent
Nguyen

[11] Patent Number: 5,838,748
[45] Date of Patent: Nov. 17, 1998

[54] COMMUNICATION INTERFACE BETWEEN COMPUTER AND SYNCHRONOUS DIGITAL TELEPHONE LINE EMPLOYING ASYNCHRONOUS DATA TRANSMISSION FORMAT AND HAVING ENHANCED RELIABILITY

[75] Inventor: Hai Nguyen, East Brunswick, N.J.

[73] Assignee: Star Dynamic Corp., North Bergen, N.J.

[21] Appl. No.: 698,288

[22] Filed: Aug. 14, 1996

Related U.S. Application Data

[63] Continuation of Ser. No. 21,868, Feb. 24, 1993, abandoned.

[51] Int. Cl.⁶ .................................................. H04L 25/38
[52] U.S. Cl. ........................................... 375/370; 370/305
[58] Field of Search ............................ 370/48, 309, 305; 375/370

[56] References Cited

U.S. PATENT DOCUMENTS

| | | | |
|---|---|---|---|
| 4,291,372 | 9/1981 | Forbes et al. | 364/885 |
| 4,293,909 | 10/1981 | Catiller et al. | 364/884 |
| 4,479,123 | 10/1984 | Loskorn et al. | 340/825.06 |
| 4,569,062 | 2/1986 | Dellande et al. | 375/370 |
| 4,608,685 | 8/1986 | Jain et al. | 370/352 |
| 4,633,487 | 12/1986 | Goeb et al. | 375/371 |
| 4,635,275 | 1/1987 | Borg et al. | 375/222 |
| 4,685,123 | 8/1987 | Hsia et al. | 379/93.09 |
| 4,700,358 | 10/1987 | Duncanson et al. | 375/222 |
| 4,748,656 | 5/1988 | Gibbs et al. | 379/93.05 |
| 4,761,800 | 8/1988 | Lese et al. | 375/370 |
| 4,779,274 | 10/1988 | Takahashi et al. | 371/32 |
| 4,805,210 | 2/1989 | Griffith, Jr. | 379/195 |
| 4,853,954 | 8/1989 | Richards | 379/93.32 |
| 4,860,193 | 8/1989 | Bentley et al. | 395/875 |
| 4,930,150 | 5/1990 | Katz | 379/92.03 |
| 4,939,773 | 7/1990 | Katz | 379/204 |
| 4,939,777 | 7/1990 | Oka | 379/387 |
| 4,953,199 | 8/1990 | Hoshi et al. | 379/93.11 |
| 4,969,136 | 11/1990 | Chamberlin et al. | 369/29 |
| 4,987,590 | 1/1991 | Katz | 379/204 |
| 5,016,270 | 5/1991 | Katz | 379/92.03 |
| 5,054,020 | 10/1991 | Meagher | 370/305 |

Primary Examiner—Robert B. Harrell
Assistant Examiner—Kenneth R. Coulter
Attorney, Agent, or Firm—Ostrolenk, Faber, Gerb & Soffen, LLP

[57] ABSTRACT

Apparatus and method for providing communication between two computers over a communications network and for detecting a command word received form the network for interrupting normal communication. In one embodiment, the apparatus includes a first part for organizing data transmitted onto the network in asynchronous format such that the data is arranged in frames with a flag designating the start of each frame and having an interframe period between each frame during which data is not transmitted. Each frame has a time period less than the predetermined time of transmission of the command word. The apparatus includes a second part responsive to the command word for interrupting normal communication, and a third part responsive to the flag for placing the second part in a disabled state for the time period of each frame, and when the frame time period is complete, for enabling the second part to respond to the command word during the interframe period. In another embodiment, a defined number of contiguous data bytes are counted after receipt of the first command code. If a prescribed number of command codes are received during the defined count of contiguous bytes, communication is interrupted. The apparatus also provides for digital detection of a digital dial state indication signal sent by the network and for dialing on the network in response to the digital dial state indication signal. Furthermore, data is transmitted to and from the network in asynchronous format synchronized to the line frequency of the network.

38 Claims, 13 Drawing Sheets

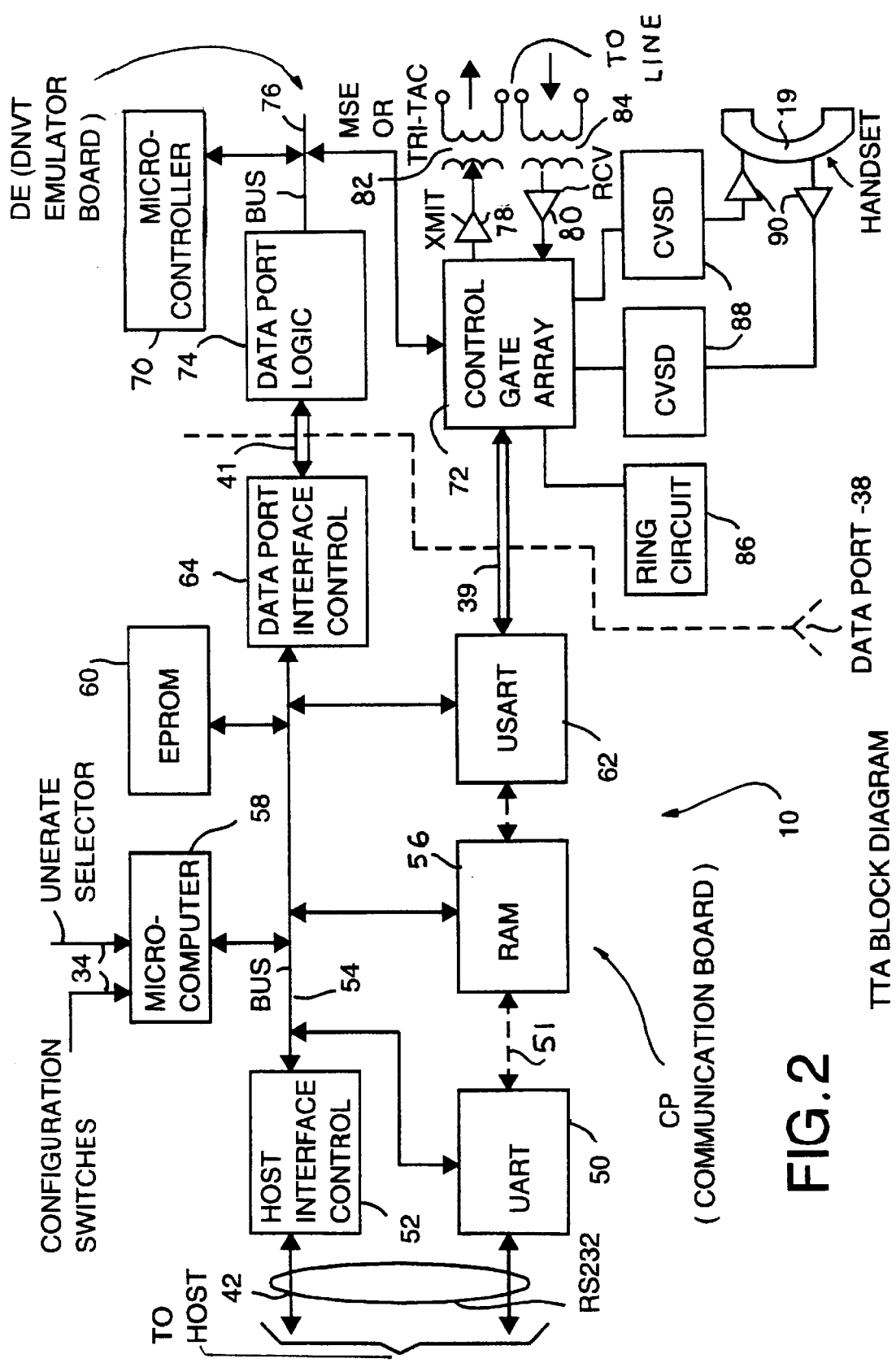
FIG. 2    TTA BLOCK DIAGRAM

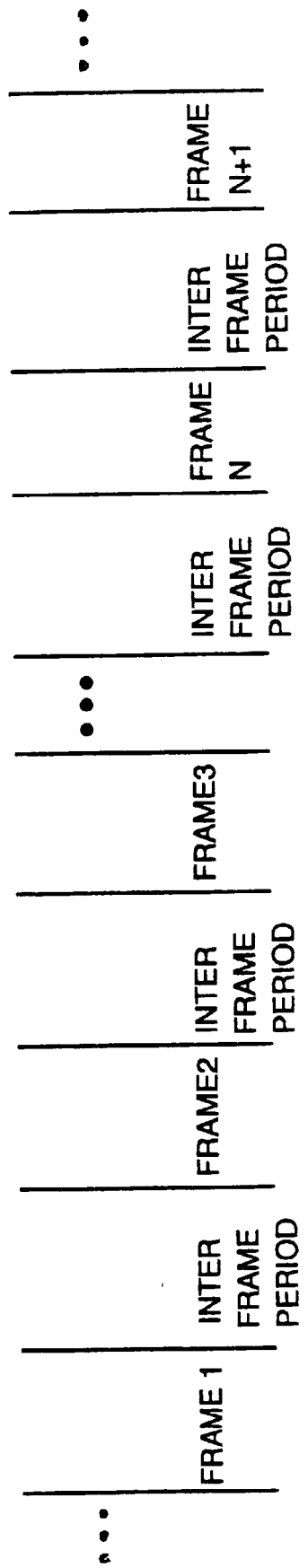

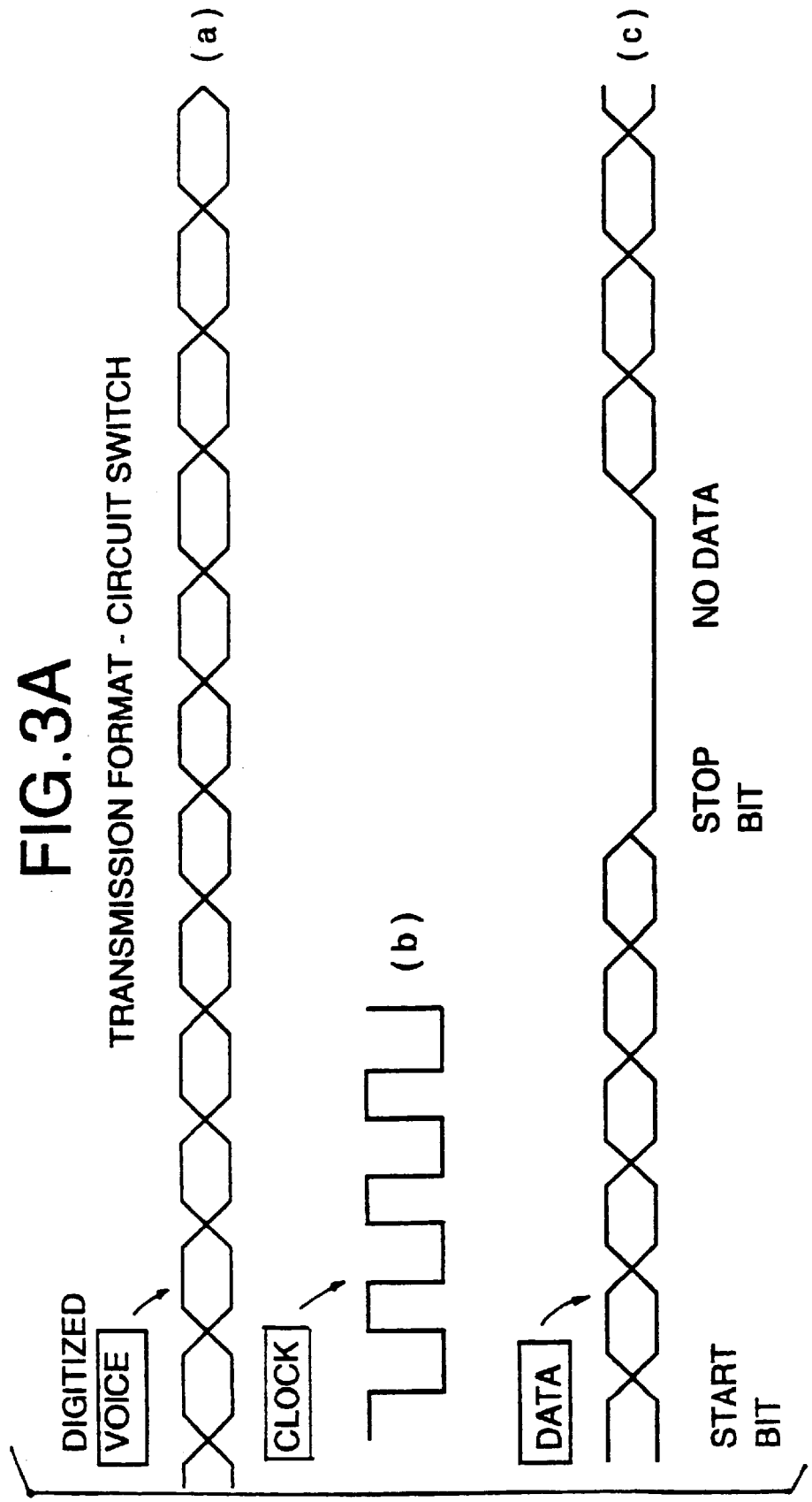

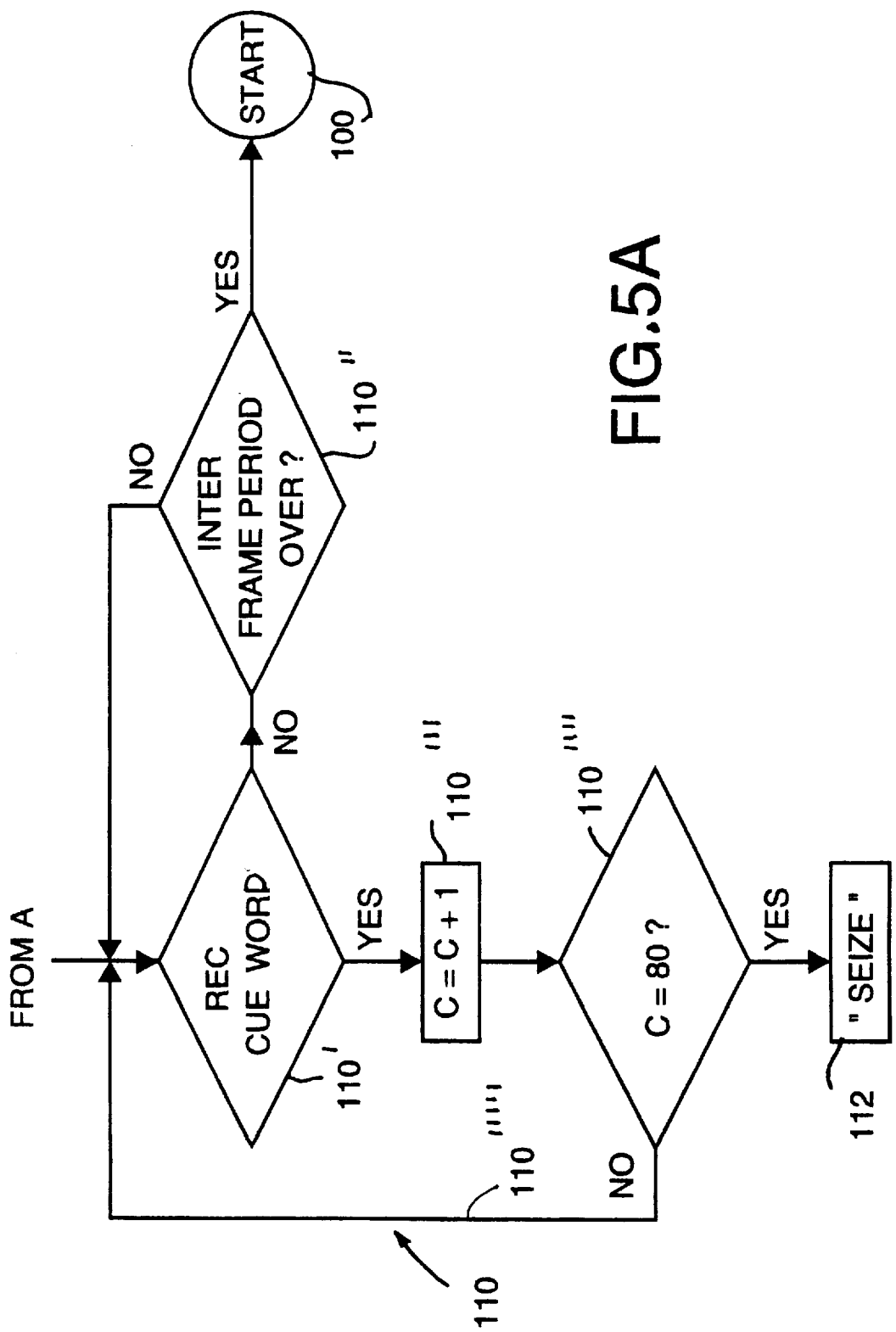

N = NUMBER OF CUE BYTES
M = NUMBER OF CONTIGUOUS BYTES

COMMUNICATION INTERFACE BETWEEN COMPUTER AND SYNCHRONOUS DIGITAL TELEPHONE LINE EMPLOYING ASYNCHRONOUS DATA TRANSMISSION FORMAT AND HAVING ENHANCED RELIABILITY

This is a Continuation of application Ser. No. 08/021,868, filed on Feb. 24, 1993, now abandoned.

BACKGROUND OF THE INVENTION

The present invention relates to a communications interface between a host computer and digital telephone lines. In particular, the present invention allows host computers, for example, personal computers or other processors, to communicate over digital voice/data telephone lines, for example, Mobile Subscriber Equipment (MSE) or Tri-Tac digital telephone lines. The present invention emulates the functions of Digital Non-Secure Voice Terminal Model TA-1042A (DNVT), or the emulator portion of the invention can be switched out to allow interfacing with the data port of an external DNVT/DSVT (Digital Secure Voice Terminal) and then communicate through the Tri-Tac/MSE network. Devices of this type are also known as Tactical Terminal Adapters (TTA).

There is a need to transmit both voice and data from one terminal including a personal computer to another through an existing communication network called the Tri-Tac or MSE network. Presently, TTAs are used with this network to translate the format, protocol and frequency and digitally encode and decode the signals and data to that which only the unique Tri-Tac/MSE network can respond.

One of the problems with the existing TTAs used with the Tri-Tac/MSE network is that the terminals attached to the network are required to respond to certain digital code words. One of these code words is the CUE code word. This code word, when received from the Tri-Tac/MSE network by a terminal, must interrupt the normal communication of voice or data over the network and set the TTA itself to a seized state, thus preventing all presently ongoing communication and seizing the network for emergency usage or communication, for example.

A problem arises when in the course of normal digital data reception in what is known as the TRAFFIC mode, it is possible for duplicates of the CUE code word to appear as combinations of unrelated data bytes embedded in a data stream. Some data characters either duplicate CUE or the end of one byte combined with the start of another byte in the data stream duplicates CUE. Since there is no way for the terminal to distinguish between the reception of an actual transmitted CUE code word command and the duplicate, the terminal may be unnecessarily interrupted during a transmission.

It is an object of the present invention to provide a solution to this problem.

In particular, it is an object of the present invention to provide a method and apparatus for detecting specific code words over a communications network in an error-free manner.

Furthermore, it is an object of the present invention to detect specific code words transmitted over the network so as to prevent unnecessary interruption during a transmission.

It is yet still a further object of the present invention to detect in a reliable and error-free way the receipt of a repeated code word which is used to interrupt transmission.

It is yet still another object of the invention to provide a reliable device and method to detect specific code words transmitted over a packet switch network.

It is yet still a further object to provide a reliable method and apparatus for detecting specific code words transmitted over a circuit switch network.

Another problem existing in the prior art TTAs is their inability to detect reliably when the network is ready to receive communications from a computer connected to it. In prior art TTAs, the network transmits a digital dial state indication signal when it is ready to receive communications. This digital dial state signal is normally converted at the TTA into an analog dial tone signal, which is used by a human operator to initiate dialing for voice communication. The host computer does not use this signal, but instead simply waits a certain time-out period before dialing to initiate data communication. Sometimes, however, the network may not have transmitted a dial state signal by the time the time-out has elapsed, and the computer initiates dialing before the network is ready. This presents the possibility of spurious connections and communications.

It is an object of the present invention to provide means for determining when a communications network is in a condition allowing it to respond to communications from a computer attached to the network.

It is yet still a further object to use the digital dial state indication signal generated by the network as an indication of when a communications device coupling a computer and the network can initiate dialing prior to digital data communication.

Another problem in the prior art TTAs is that the Tri-Tac/MSE networks which connect to such TTAs operate in a synchronous environment. The use of synchronous communications protocols requires more complex circuitry, including clock circuitry, to synchronize the TTAs to the network. The use of synchronous protocols therefore decreases equipment reliability. Furthermore, personal computers communicate data in asynchronous format which must then be converted into synchronous format for transmission over the network, again increasing cost and complexity and reducing reliability.

It is an object of the present invention to provide a device which interfaces a computer having an asynchronous communications port to a synchronous environment and which allows the transmission of data in asynchronous format in the synchronous environment.

It is yet still a further object of the present invention to provide such an interface between a computer and a synchronous network which allows asynchronous transmission over the network and which increases communication and equipment reliability and decreases equipment cost and complexity.

It is yet still a further object of the present invention to allow a computer having an asynchronous communications port to interface with a synchronous communications network and which allows data essentially transmitted asynchronously to be transmitted over the synchronous network.

It is yet still a further object of the present invention to provide a method and apparatus for transmitting asynchronous data synchronously over a synchronous network.

It is yet still a further object of the invention to allow computers transmitting and/or receiving data at different rates to communicate over a synchronous network.

It is yet still a further object of the invention to provide a method and apparatus for allowing asynchronous data whose frequency is not a sub-multiple of the synchronous network frequency to be transmitted via the synchronous network.

SUMMARY OF THE INVENTION

The above and other objects are achieved according to one embodiment of the present invention, preferably in a packet switch network, by an apparatus for providing communication between two computers over a communications network and for detecting a command word received from the network for interrupting normal communication, the command word being repeated for a predetermined time, the apparatus comprising first means for organizing data transmitted onto the network in asynchronous format such that the data is arranged in frames with a flag designating the start of each frame and having an interframe period between each frame during which data is not transmitted, each frame having a time period less than the predetermined time of transmission of the command word, second means responsive to the command word for interrupting normal communication and third means responsive to the flag for placing the second means in a disabled state for the time period of each frame, and when the time period is complete, for enabling the second means to respond to the command word during the interframe period.

The above and other objects are furthermore achieved according to another embodiment of the invention, preferably in a circuit switch network, by an apparatus for providing communication between two computers over a communications network and for detecting a command word received from the network for interrupting normal communication, the command word being repeated for a predetermined time, the apparatus comprising first means for organizing data transmitted onto the network in asynchronous format such that the data is arranged between start and stop bits with periods of no data between stop and start bits, second means responsive to the command word for determining if a predetermined number of said command words are received during a defined number of contiguous bytes of said data, and third means responsive to receipt of said predetermined number of said command words in said defined number of contiguous bytes for interrupting communication.

The objects of the invention are furthermore achieved by an apparatus for providing communication between a computer and a communications network, comprising first means coupled to the network for detecting a digital dial state indication signal from the network and for generating a digital control bit indicating the presence of said digital dial state indication signal, second means coupled to the computer for providing communication between the computer and the network, said second means being responsive to said digital control bit so as to dial a telephone number for transmission over said network to initiate communication with another computer coupled to said network.

The objects of the invention are additionally achieved by an apparatus for providing communication between two computers over a synchronous communications network having a line frequency, the apparatus comprising first means coupled to one of the computers for receiving and transmitting data from and to said one of the computers in asynchronous format and second means for receiving and transmitting data from and to said network in asynchronous format synchronized to the line frequency of the network.

According to a preferred embodiment of the invention, the apparatus further comprises a third means coupling the first and second means, the third means comprising buffer storage means for storing data therein and performing a rate conversion on said data.

The above and other objects are furthermore achieved according to one embodiment of the present invention, preferably in a packet switch network, by a method for providing communication between two computers over a communications network and for detecting a command word received from the network for interrupting normal communication, the command word being repeated for a predetermined time, the method comprising organizing data transmitted onto the network in asynchronous format such that the data is arranged in frames with a flag designating the start of each frame and having an interframe period between each frame during which data is not transmitted, each frame having a time period less than the predetermined time of transmission of the command word, detecting the flag, disabling detection of the command word in response to detecting the flag for the time period of each frame, enabling detection of the command word during the interframe period when the frame time period is complete, detecting the command word during the interframe period and interrupting normal communication when the command word is detected in the interframe period.

The above and other objects are achieved according to another embodiment of the invention, preferably in a circuit switch network, by a method for providing communication between two computers over a communications network and for detecting a command word received from the network for interrupting normal communication, the command word being repeated for a predetermined time, the method comprising organizing data transmitted onto the network in asynchronous format such that the data is arranged between start and stop bits with periods of no data between stop and start bits, determining, in response to the receipt of a first command word, if a predetermined number of said command words are received during a defined number of contiguous bytes of said data, and interrupting communication in response to receipt of said predetermined number of said command words in said defined number of bytes.

The above and other objects of the invention are also achieved by a method for providing communication between a computer and a communications network, comprising detecting a digital dial state indication signal from the network and generating a digital control bit indicating the presence of said digital dial state indication signal, providing said digital control bit to dialing means coupled to said computer, said dialing means being responsive to said digital control bit so as to dial a telephone number and dialing said telephone number for transmission over said network to initiate communication with another computer coupled to said network in response to said control bit.

The objects of the invention are additionally achieved by a method for providing communication between two computers over a synchronous communications network having a line frequency, the method comprising receiving and transmitting data from and to one of said computers in asynchronous format and receiving and transmitting data from and to said network in asynchronous format synchronized to the line frequency of the network.

According to a preferred embodiment, the method further comprises coupling the data between the one of said computers and the network through buffer storage means for storing data therein and performing a rate conversion on said data.

Other features and advantages of the present invention will become apparent from the following description of the invention which refers to the accompanying drawings.

BRIEF DESCRIPTION OF THE DRAWINGS

The invention will be described in greater detail in the following detailed description with reference to the drawings in which:

FIG. 2 is a block diagram of the communications interface according to the present invention;

FIG. 3 shows how the asynchronous data received and transmitted by the communications interface of the present invention is organized for communication over a synchronous packet switch communications network;

FIG. 3A shows how the asynchronous data received and transmitted by the communications interface of the present invention is organized for communication over a synchronous circuit switch communications network;

FIG. 3B shows a command word generated by the network known as the CUE signal;

FIG. 5A provides further details of the code word detection scheme shown in FIG. 5;

DETAILED DESCRIPTION OF THE INVENTION

General

With reference now to the drawings, the present invention comprises a communications interface between a host computer and a digital voice/data telephone network, in particular, the MSE or Tri-Tac network, previously described. The communications interface according to the present invention, as already described, is known as a tactical terminal adapter (TTA). In particular, it allows personal computers or Battlefield Functional Area (BFA) processors equipped with an RS232-C port to communicate with each other via the MSE or Tri-Tac digital telephone network (Tri-Tac/MSE). The invention emulates the functions of the Digital Non-Secure Voice Terminal Model TA-1042A (DNVT) or the emulator can be switched out and the TTA can interface with the data port of an external DNVT/DSVT (Digital Secure Voice Terminal) and then communicate through the Tri-Tac/MSE system.

In its full operational mode, the TTA appears to the host processor or PC as a Hayes compatible interface supporting Hayes commands as well as several additional commands related to the digital telephone system. The MSE or Tri-Tac network comprises a four-wire digital line, and the TTA appears to the four-wire digital line as a DNVT. Preferably, the TTA communicates with the PC in both command and data modes at 1200, 2400, 4800 or 9600 baud rates. On the four-wire digital MSE network, it communicates at 16 KHz; the four wire/Tri-Tac network communicates at 32 KHz. The invention allows communications over both packet switch and circuit switch networks, as will be described.

Figure 1:
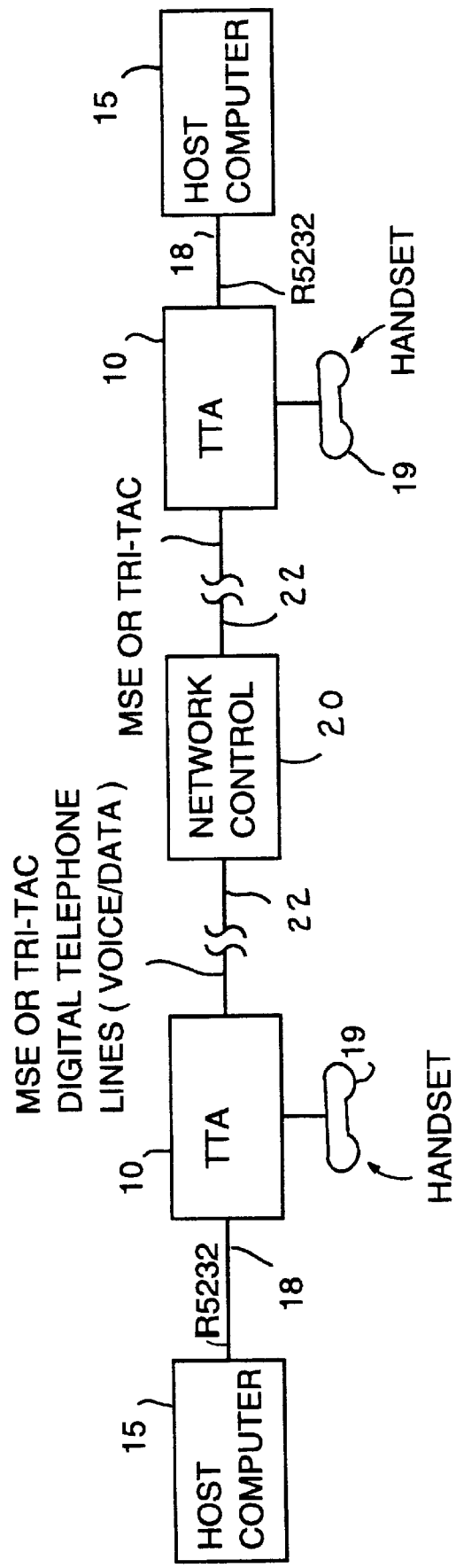
FIG. 1 is a block diagram of how the invention connects between host computers and the communications network.

With reference now to the drawings, FIG. 1 shows the operational environment of the invention. A communications interface or TTA 10 is provided at both ends of the MSE or Tri-Tac digital telephone network. The network control switchboard is indicated at 20, and the MSE or Tri-Tac lines at 22. The MSE or Tri-Tac lines are four-wire telephone lines able to carry both voice and digital data. The voice is transmitted in digital format.

A host computer or PC 15 is coupled to each TTA 10 through an RS232 communications link 18. The host processor has a communications software package capable of interfacing with the TTA, for example, through a modem, such as a Hayes or Hayes compatible modem (i.e., PROCOMM, BLAST, etc.). Each TTA also includes a handset 19 for voice communications and the necessary analog/digital and digital/analog conversion circuitry.

In the prior art, TTAs typically communicate over the MSE or Tri-Tac network using a 16 KHz (MSE) or 32 KHz (Tri-Tac) synchronous digital format. This means that the digital data transmitted over the MSE or Tri-Tac lines 22 are transmitted in digital form synchronized to a clock frequency signal derived from the data signals transmitted over the network. Other prior art TTAS have used an asynchronous format at the originating low baud rate and randomly with line frequency. This constitutes a waste of valuable bandwidth and furthermore, because the originating asynchronous data is not a sub-multiple of the synchronous network line frequency, inaccuracies in communication can result. In the TTA according to the present invention, as will be explained in greater detail below, an asynchronous digital communications format is utilized. The digital data, however, although asynchronous in format, is at the same frequency and synchronized to the line frequency of the MSE or Tri-Tac lines 22.

Figure 1A:
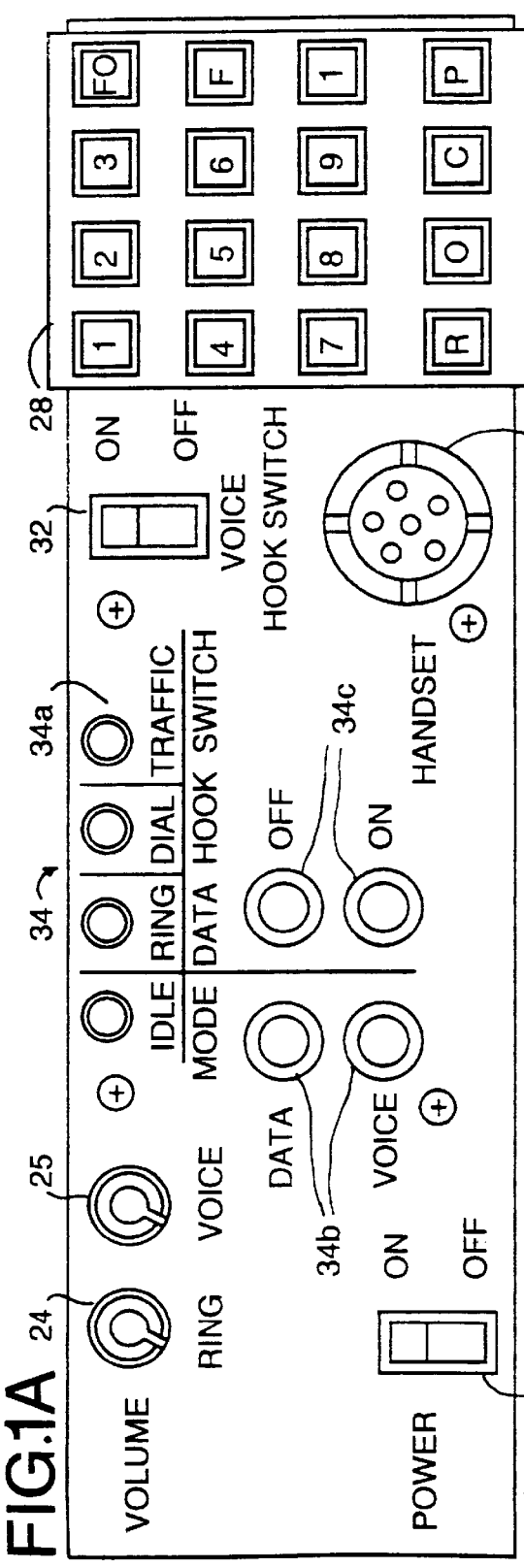
FIG. 1A shows the front panel of the communications interface according to the present invention.

FIG. 1A shows the front panel of the TTA 10. The front panel includes a ring volume control 24, a voice volume control 25, an on-off switch 26, a dial keypad 28 (for manual dialing), a connecting jack 30 for the handset 19, a voice hook switch 32, and a series of status indicator lamps or LEDs 34 (any other convenient display device can also be used) for indicating the mode of the TTA. These various modes will be explained in greater detail with reference to FIG. 8. The upper row 34a of status lights indicate the status of the DNVT emulator portion of the TTA (to be described in greater detail below) when in the IDLE, RING, DIAL or TRAFFIC states. The two lower columns 34b and 34c of status lights indicate whether the TTA is in its data or voice mode (34b) and whether the data hook switch is in the on-hook or off-hook state (34c).

Figure 1B:
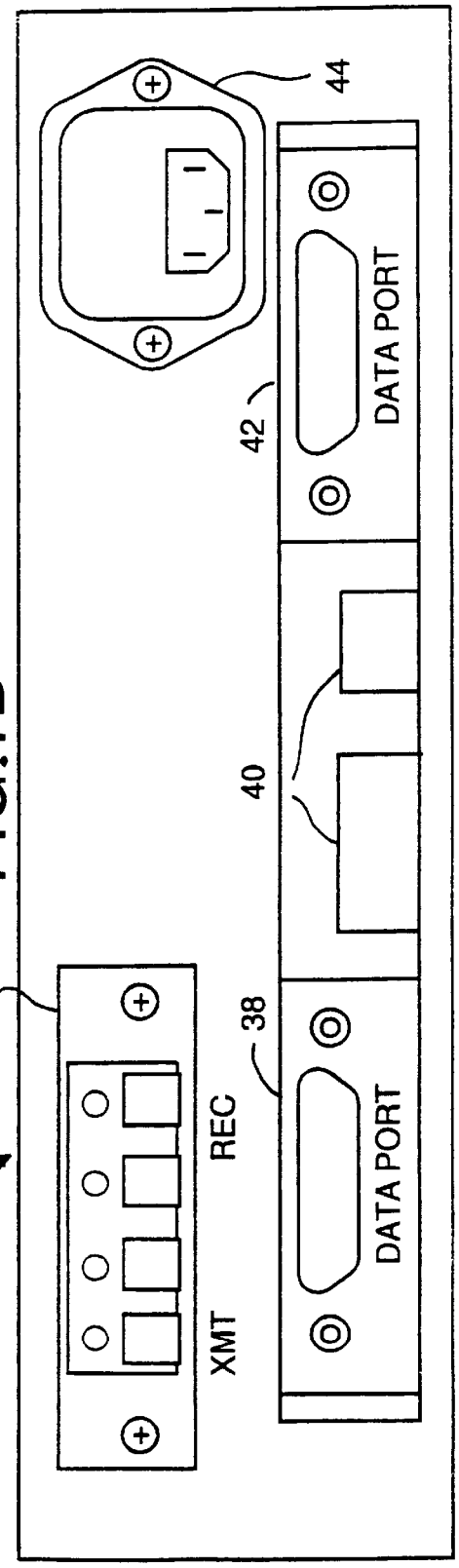
FIG. 1B shows the rear panel of the communications interface according to the present invention.

FIG. 1B shows the rear panel. On the left side are the four-wire digital telephone line connectors for both transmit and receive. These are shown by reference numeral 36. The data port connector, to be explained in greater detail below, is found at 38. Configuration switches are found at 40 for configuring the TTA, including, for example, two switches (switches 1 and 2) for setting the baud rate amongst 1200, 2400, 4800 and 9600 baud, a third switch (switch 3) for optional error correction (Forward Error Correction-FEC), a fourth switch (switch 4) for determining a default mode (when the switch is on, the default mode is data; when it is off, the default mode is voice), a fifth switch (switch 5) for level converter mode (when the switch is on, the TTA operates as if it were a level converter), a sixth switch (switch 5) for test mode (when the switch is on, the TTA is on-line and the DNVT emulator is in the TRAFFIC state immediately after power is turned on and is ready to transfer data). An internal switch (line rate selector) is provided to set the line frequency default to either 16 KHz or 32 KHz. This internal switch may be, for example, a jumper on the communications board portion of the invention, to be described later. Additional switches may be provided for additional configurations. The RS232 port is shown at 42 and the power connection at 44.

FIG. 2 shows the block diagram for the TTA. The TTA 10 includes a communications board CP and a DNVT emulator board DE. The communications board CP includes the RS232 port 42, which connects to a Universal Asynchronous Receiver Transmitter (UART) 50 and a host interface control 52. The host interface control 52 connects to a control bus 54 which interconnects with the UART 50, a random access memory RAM (56), a microcomputer 58, which controls the operations of the other components, an erasable-programmable read-only memory 60 (EPROM), a Universal Synchronous/Asynchronous Receiver Transmitter 62 (USART) and a data port interface control 64. The UART 50 may be a type 82C50, the RAM may be a type 62256, the USART may be a type 85C30, the EPROM a type 27C64 and the microcomputer a type 68HC11, but those of skill in the art will realize that other components may be utilized in their place with suitable modification, as necessary and understood by those of skill in the art.

The host interface control 52 and data port interface control 64 comprise standard components for I/O control, as known to those of skill in the art. In particular, the host interface control 52 comprises a standard RS232 to control bus converter, and controls the "handshaking" necessary to exchange data at the RS232 port 42 with the TTA, and in particular UART 50. Data Port Interface Control 64 comprises any of known standard controls for exchanging control functions of bus 54 with line 41, to be described below.

As shown in FIG. 2, the configuration switches 40 and line rate selector jumper are inputs to the micro-computer 58, and perform the functions previously described.

The input/output line of the data port interface control 64 and the USART 62 comprise the data port 38, shown also in FIG. 1b.

The second portion of the TTA 10 is the DNVT emulator board DE. This portion of the TTA 10 includes a microcontroller 70, a control gate array 72 and a data port logic 74. The microcontroller 70, control gate array 72 and data port logic 74 communicate via a bus 76. The control gate array 72 receives communications from the USART 62 via the data bus line 39. The data port logic 74 receives communications along the bus lines 41 for controlling the transfer of information over data lines 39. The control gate array 72 is coupled via suitable amplifier transmit/receive stages 78 and 80 to the Tri-Tac/MSE communications lines via suitable isolation/impedance matching transformers 82 and 84. As described, the Tri-Tac/MSE lines are four-wire telephone lines capable of transmitting both voice and digital data at line frequencies of either 16 KHz or 32 KHz. Although the invention is utilized with MSE or Tri-Tac lines operating at these frequencies, it will be understood by those of skill in the art that the invention could also be used with other digital data or voice/data telephone lines operating at frequencies other than 16 and 32 KHz.

The control gate array 72 is coupled to a ring circuit 86 for providing a handset ringing signal and also to the handset 19. Suitable modulation and amplification stages are utilized to convert between ordinary analog format and a digital format which provides a degree of bandwidth compression. In the embodiment shown, continuously variable slope delta modulator/demodulators 88 have been provided to compress/decompress, as required, and to provide suitable analog/digital and digital/analog conversion. Amplifier stages 90 are also provided as required and as understood by those of skill in the art.

Suitable components for the DE board are as follows. The microcontroller may be a type 68HC05, the CVSD modulator/demodulators may be type MC3517, and the control gate array can be implemented by a standard control gate array suitably modified in accordance with the state diagram of FIG. 9, to be described later. In the actual embodiment of the invention, a custom designed control gate array, rather than a programmable gate array, is utilized, but those of skill in the art will understand that a standard control gate array suitably programmed (i.e., "burned-in") in accordance with the invention can be used.

The CP communicates with the host processor 15 via the RS-232 port and to the DE or external DNVT/DSVT via the data port. The TTA analyzes and executes commands from the host processor, translates and sends the line code words back to the host processor and thereby performs the auto-dial and auto-answer functions from the DE or from the external DNVT/DSVT. The DE performs all of the functions of these equipments including voice and data modes.

Transmission Format—General

As explained previously, an aspect of the invention is that data transmission between TTAs over the Tri-Tac/MSE lines takes place in an asynchronous format, with the digital data synchronized to the line frequency. The data can be organized for either a packet switch network or a circuit switch network. In some prior art TTAs, a pure synchronous format is used, and when there is no data to transmit, stuff bits are used. Although the MSE or Tri-Tac lines use a synchronous format, with the line frequency of either 16 or 32 KHz, the host processors 15 communicate with the TTA in an asynchronous (RS232) protocol. In this protocol, whenever there is a data byte to be sent, it is sent with several overhead bits to synchronize instantaneously with the other side. When there is nothing to send, the line is quiet.

As discussed, in prior TTA designs, the data is sent from one DNVT to another DNVT over the Tri-Tac/MSE network either synchronously at the line frequency (16 KHz/32 KHz) or asynchronously at a low baud rate and randomly with line frequency. In contrast, in the present invention, the data bytes are sent asynchronously, but at a baud rate that is the same and synchronized with the line frequency (16 KHz or 32 KHz), not the originating/receiving host processor frequency. This provides dual synchronization because the signals are synchronized twice, once between the two DNVT's on the network, and once instantaneously within the TTA itself by the UART 50 that carries out the RS232 protocol. This results in unique advantages, i.e., the double synchronization increases the reliability of the communication and the hardware and software necessary are reduced and simplified because the asynchronous process is easier to implement than a synchronous one. This increases equipment reliability.

Additionally, this system, because of its use of a rate translation technique, allows host processors communicating at different rates to communicate with each other. This will be described in greater detail below.

Transmission Format—Packet Switch

FIG. 3 shows how the data transmitted or received over a packet switch network by the TTA 10 is organized. Packet switches generally are data only, i.e., no voice. As shown, the data is asynchronous and thus organized into frames, with an interframe period between frames. Each frame comprises N bytes, for example, 512 bytes, with the interframe period being variable, but typically comprising a fraction of the frame time. Assuming each frame is illustratively 512 bytes, and assuming 8 bits per byte, one frame is 4096 bits, and each frame is therefore approximately a quarter second at 16 KHz. At 32 KHz, each frame would be approximately an eighth of a second. The relationship of the interframe time period to the frame time period will be discussed in greater detail below.

Transmission Format—Circuit Switch

FIG. 3A shows the organization of data transmitted over a circuit switch network. In this format, voice data is transmitted in digital format as shown at FIG. 3A(a) synchronized to a clock (FIG. 3A(b) derived from the signals transmitted over the network. Digital data is transmitted such that it is organized with a start bit at the beginning of data transmission followed by the transmitted data bits. At the end of the data transmission, a stop bit is provided followed by no data bits until another start bit identifies the beginning of further data transmission (FIG. 3A(c).

Response to CUE—Packet Switch

Figure 4:
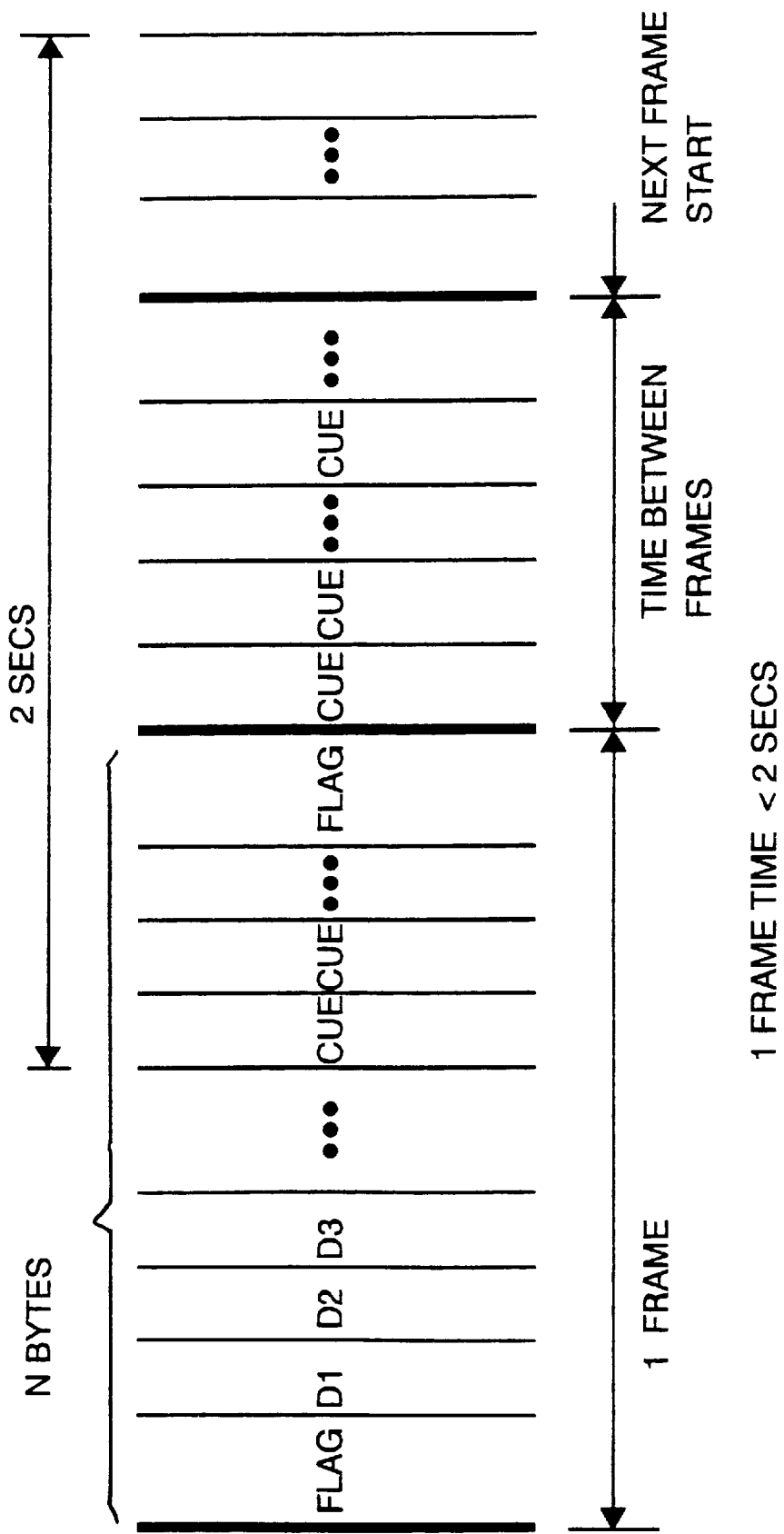
FIG. 4 is a timing diagram showing how a particular command code word which interrupts transmission on the network is detected according to one embodiment of the invention.

FIG. 4 shows the relationship and organization of each frame and interframe period in greater detail for the packet switch network. As shown, each frame begins with a FLAG byte identifying the start of a frame. This is followed by the data bytes D1, D2, D3 . . .

In FIG. 4, certain bytes illustratively identified "CUE" have been shown starting in frame 1 and extending into the interframe period between frames 1 and 2. The CUE code is shown in FIG. 3B. The reason for this will now be explained.

Terminals in the Tri-Tac/MSE system are required to respond to a certain digital code word in emergency situations which causes the terminal to go into a seized state. As discussed, this digital code word is known as the CUE signal. When this signal is received from the Tri-Tac/MSE network, all communication must be interrupted, and the terminal must go into the seized state.

A problem arises when in the course of normal digital data reception it is possible for duplicates of the CUE code word to appear as combinations of unrelated data bytes embedded in the data stream. Some data characters either duplicate CUE or the end of one byte combined with the start of the next byte in the data stream duplicates CUE. Since there is no way for the terminal to distinguish between the reception of an actual transmitted CUE code word command and the duplicate, the terminal may be unnecessarily interrupted during a transmission.

The CUE code word is transmitted on the Tri-Tac/MSE network as a repeated sequence of the CUE signals. In particular, the CUE command is transmitted as a sequence of CUE code words which last for at least two seconds. This is shown in FIG. 4. As also shown in FIG. 4, one frame comprises N bytes and one frame time is less than two seconds. This means that even if the CUE command was issued at the very beginning of a frame, it would necessarily extend into the interframe period between frames and also beyond that into the next several frames and interframes.

As shown in FIG. 4, the start of a frame is designated by the FLAG byte (FLAG), followed in the normal course by data bytes D1, D2, D3 . . . When a CUE command is issued, as shown in FIG. 4, because the frame is less than the at least two second CUE command time period, at least one (actually many) CUE code word will be received in the interframe period. The receipt of the CUE code word during the interframe period, according to one embodiment of the invention, causes a connecting pin labeled CUE control to be raised in voltage level. The CUE control pin is one of the lines on the bus 76 and the determination of whether the CUE code word has been received is made by the control gate array 72 under control of micro controller 70. The control gate array includes a template (comparator) which compares the incoming data which circulates through a register in the control gate array, to the prestored CUE code word stored in another register. The system operates, as described in greater detail with respect to FIGS. 5 and 5A, so that during a frame period, the system is "blind" or disabled to the CUE code word because the CUE control pin disables detection. Thus, during the frame period, the system cannot mistakenly determine that a CUE code word has been received when actually some other command has been issued.

The only time that the system can determine if the CUE code command has been issued is during the interframe period when the level of the CUE control pin enables detection. The CUE control pin is raised, illustratively, in voltage level when the control gate array 72 detects the FLAG byte. Raising of the CUE control pin disables the response of the DE circuit to the CUE code word. When N number of bytes have been processed (one frame), the DE circuit lowers the CUE control pin voltage level and the DE circuit is allowed to respond to an actual CUE word in the interframe period. This will be described in further detail below. Since an actual CUE code word must be transmitted continuously for a minimum of two seconds (4,000 times at 16 KHz or 8,000 times at 32 KHz line frequency) and the DE circuit is blind to the actual CUE code word only N times maximum (in the preferred embodiment 512 times because there are 512 bytes in a frame), there is no chance of not responding to an actual CUE code word and no chance of responding to a false CUE code word (since it will only be detected during the interframe period when no other communication takes place).

The CUE command, as discussed, comprises a multiple repetition of the CUE code word. Since it is issued by the network for at least two seconds, and a frame is less than two seconds, if a CUE command has been issued, at least a portion of it will be received during the interframe period when the system is looking for the CUE command.

Figure 5:
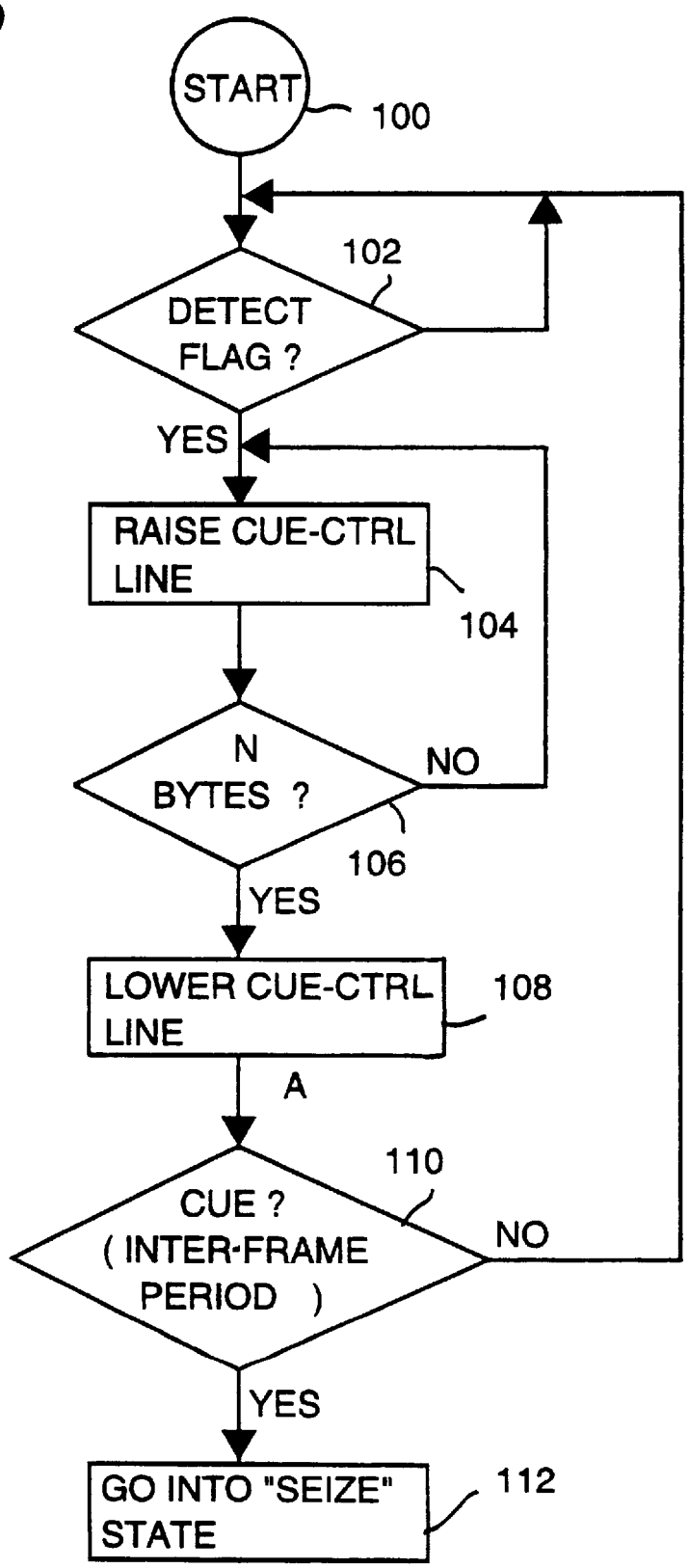
FIG. 5 is a flow diagram showing how the command code word for interrupting transmission is detected according to one embodiment in a packet switch network.

FIGS. 5 and 5A show the flow diagram that the system implements, according to one embodiment of the invention, preferably in a packet switch network, in order to detect the CUE command. Starting at 100, the system looks for the FLAG byte at 102 which determines the start of a frame. If the FLAG byte has been detected by the control gate array, the CUE control line is raised as shown at 104, blinding the system to CUE. Next, the system counts the number of bytes until the number of bytes (N) in a frame are received, illustratively, 512 bytes. This is shown at 106. As long as the system has not received N bytes, the CUE control line stays high. Once N bytes have been received, the CUE control line is lowered, as shown at 108. This means that the system is now in the interframe period, and the system is now able to detect a CUE word. Since the system is now in the interframe period, no other data transmission is taking place, so there can be no confusion with any other data bytes. Once the CUE control word has been received in the interframe period, as shown at 110, the system goes into the seized state, as shown at 112.

As shown in more detail in FIG. 5A, in order to provide an additional degree of protection, the CUE code word, even during the interframe period, must be received a certain number of times. Illustratively, the CUE code work must be received at least 80 times in order for the system to recognize a CUE command and go into the seized state. In actuality, at 16 KHz, the two second CUE code command is almost eight times longer than a frame of 512 bytes, which at 16 KHz is approximately a quarter of a second. At 32 KHz, it is approximately 16 times longer than a frame, which is approximately an eighth of a second. As shown in FIG. 5A, the CUE detection 110 is initiated at 110' by receiving the CUE code word during the interframe period. If it has not been received, a check is made at 110" to determine if the interframe period is over. If it is, the system goes back to start at 100. If not, the system continues looking for the CUE code word. Once it is received, a counter is incremented at 110'''. Once 80 bytes of the CUE word have been received, as shown at 110'''', the system goes into the seized state SEIZE at 112. Until 80 CUE bytes have been received, the system stays in the loop indicated by line 110'''''.

All detection of the CUE code word is made by comparing the incoming data from the Tri-Tac/MSE line with the prestored CUE command. This comparison is made by the control gate array 72 under control of the microcontroller 70. A register loaded with the CUE code word in the control gate array is compared to the incoming data circulating in another register, and when the comparison has been made for the required number of times, the SEIZE state is entered.

Figure 5B:
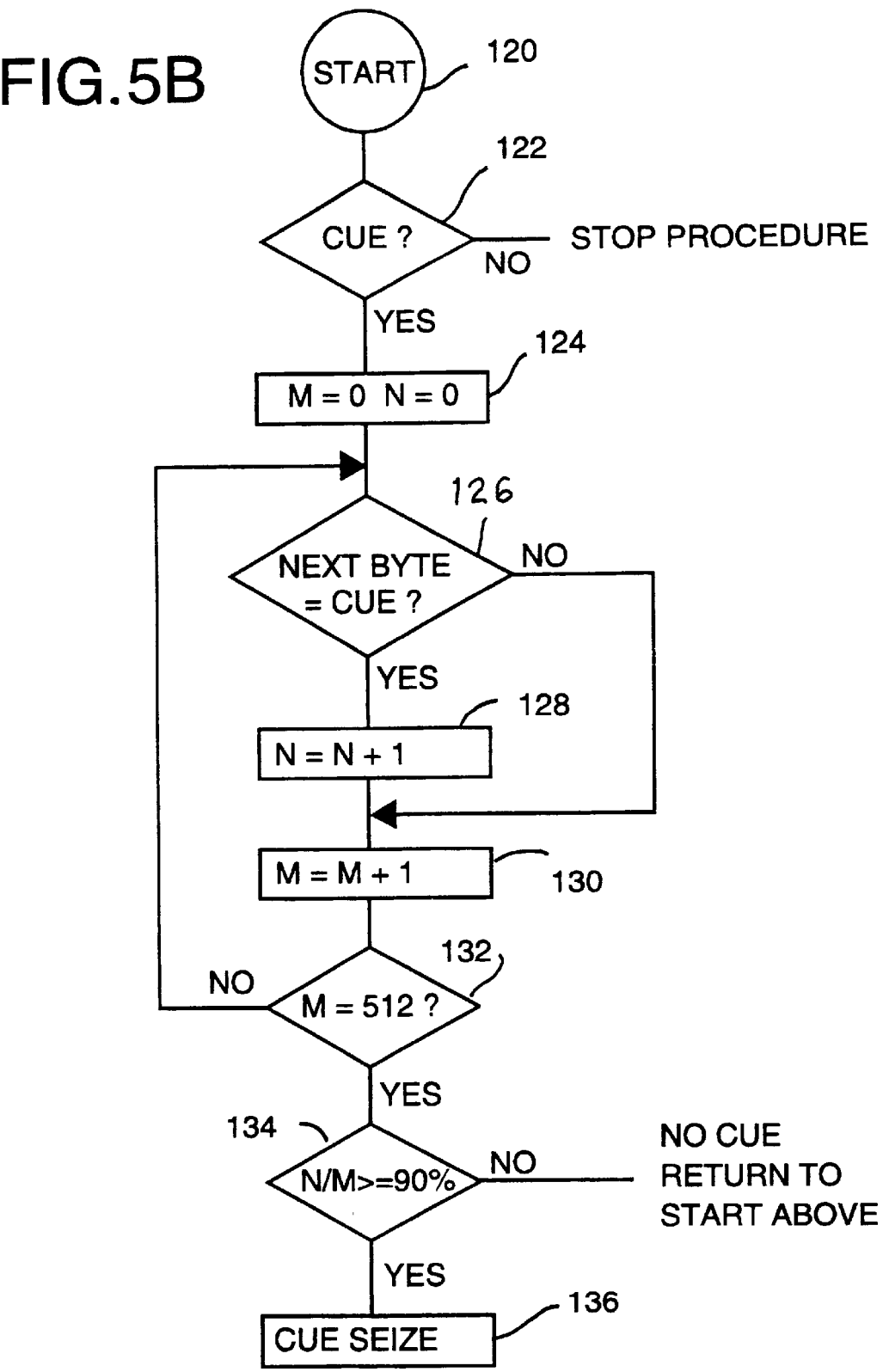
FIG. 5B shows an alternative embodiment showing how a particular command code word is detected in both a packet switch and circuit switch network.

FIGS. 5 and 5A show one method for determining presence of the CUE command. FIG. 5B shows another method which is applicable to both a packet and circuit switch. The method of FIG. 5B could also be substituted for the specific method shown in FIG. 5A, as will be described below.

Response to CUE—Packet and Circuit Switch

FIG. 5B shows the flow chart for an alternative embodiment of the invention used by the system to detect a CUE command. In this embodiment, which is applicable to both a packet switch and circuit switch network, the system looks for a first CUE byte and determines if a predetermined number of CUE bytes follow in a predefined number of contiguous bytes. In the illustrated embodiment, the system seeks to find 90% CUE bytes in a sequence of 512 contiguous bytes. The use of 512 bytes is arbitrary, and does not bear any relationship to the 512 bytes in a frame described with respect to the previously described embodiment. In fact, if a circuit switch network is used, the data is not necessarily divided into frames anyway, although start and stop bits would be used to define data. The 90% figure is used because it is possible that noise may prevent receipt of 512 bytes of CUE even in a contiguous sequence of 512 or more CUE bytes.

In this embodiment, the system is not blinded to the CUE word at any time or responsive to the CUE word only at selected times. This embodiment of the invention only seeks to determine the required number of CUE bytes at any time during the transmission of information. With reference to FIG. 5B, starting at 120, this embodiment of the invention determines if a CUE character has been received at 122. If it has, two counters, M (byte counter) and N (CUE counter), are set to 0 at 124. At 126, a check is made to determine if the next byte is CUE. If it is, the N and M counters are incremented at 128 and 130. If CUE is not detected as the next byte, a jump is made to 130 at which only the M counter is incremented. At 132, the M counter (byte counter) is checked to determine if it equals 512. If not, a return is made to step 126 at which the next byte is checked for CUE. Once M is 512, a check is made at 134 to determine if the ratio of N to M is at least 0.9. If it is, the CUE command has been detected and the SEIZE state is entered at 136. If N/M does not equal 0.9, a return is made to START at 120.

As discussed, the system shown in FIG. 5B could be substituted for the system shown in FIG. 5A, with appropriate changes to the number of contiguous bytes counted (i.e., counting less bytes where a frame is 512 bytes and the interframe period is smaller) or with appropriate changes to increase frame and interframe duration so that 512 contiguous bytes can be counted during the interframe period.

Dial State Indication

Figure 6:
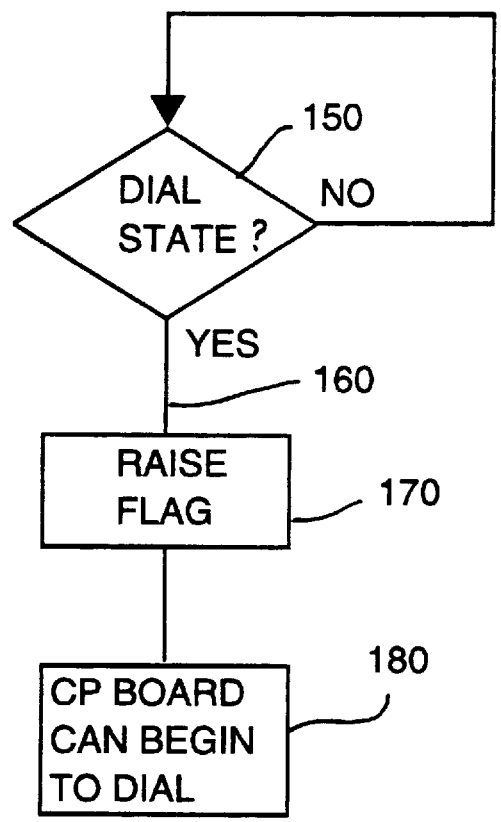
FIG. 6 is a flow diagram showing how a digital dial state signal transmitted over the communications network is detected and dialing for data communication begun.

FIG. 6 shows a further feature of the system of the invention. In the Tri-Tac/MSE network, a digital code word is generated by the switchboard of the Tri-Tac/MSE network corresponding to the moment that it is ready to receive dial information from the TTA. This digital dial state indication signal is ordinarily converted at the TTA into an analog dial tone signal, which is used by a human operator to indicate that dialing can begin for voice communication. This digital dial state indication signal is not used by the TTA to initiate dialing for data communication. Instead, the TTA of the prior art typically waits for a certain time-out to elapse, and then assumes that the network is ready to receive dialing information. The TTA then dials the necessary number to begin data communication.

This procedure can lead to faulty connection and communications, because sometimes the network is not ready to receive dialing information at the conclusion of the time-out period.

This method of determining when to dial for data communication needs substantial improvement.

Accordingly, in the TTA according to the invention, the digital terminal functions of the prior art TTA are emulated in the DE portion. This greatly simplifies detection of the digital dial indication signal. The TTA according to the present invention utilizes the dial state indication signal, normally converted to an analog signal for initiating voice communication, to initiate dialing for data communication. The microcontroller 70 recognizes the digital dial indication code word by comparing it to a prestored code corresponding to the dial indication code word, and when a comparison is made, microcontroller 70 raises a voltage level of a connecting pin to the CP circuit via bus 76. The microcontroller 70 informs the data port logic 74 via bus 76 to raise a pin on the bus 41. When this pin on the bus 41 is raised, this indicates to the CP board that the dial state is present.

FIG. 6 shows the flow diagram for detecting the digital dial state indication signal. Starting at 150, the system checks to determine if the digital dial state signal has been received. Once it has been received, as shown at 160, a dial state flag on bus 41 is raised as shown at 170, and the microcomputer 58 initiates dialing, as shown at 180.

Asynchronous Transmission Over Synchronous Network

As discussed previously, in the prior art TTAs, data transmission over the Tri-Tac/MSE network is synchronous at 16 KHz or 32 KHz, with flags or stuff bits being added to synchronize the communication when no data is being sent. A line clock rebuilt from the data stream at the network frequency is employed to synchronize the data. In another scheme of the prior art, the transmission over the network is asynchronous, but at a low baud rate corresponding to the rate at which the host processor 15 communicates, i.e., 1200 to 9600 baud. Because of the way in which the data coming from the host processor is converted to the line frequency, according to this technique, inaccuracies can result, caused primarily by the fact that the data rate from the host processor is not a sub-multiple of the line frequency. In addition, the lower baud rate represents an inefficient use of the network bandwidth.

Figure 7:
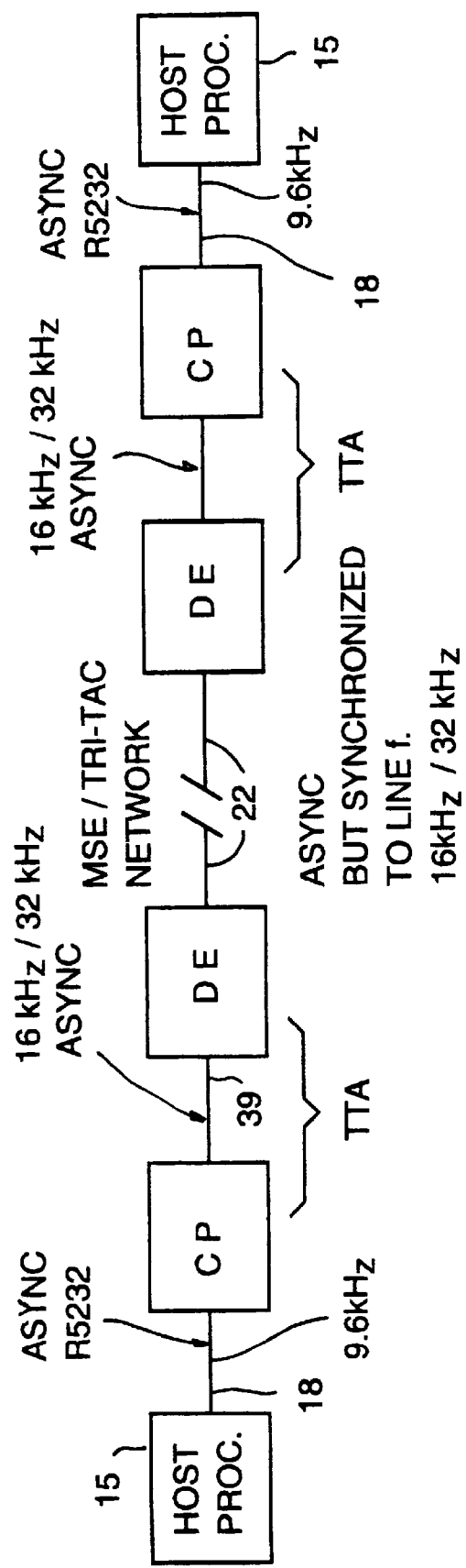
FIG. 7 is a block diagram showing how the communications interface of the present invention allows asynchronous communication over a synchronous communications network.

In contrast, as shown in FIG. 7, the TTA according to the present invention transmits over the Tri-Tac/MSE network asynchronously, but synchronized to the line frequency of 16 KHz or 32 KHz. The host processor 15 transmits to the CP portion of the TTA via an RS232 protocol at, for example, 9600 baud maximum asynchronously. This is shown at 18 in FIG. 7. Between the CP and DE portions of the TTA, i.e., over the bus 39 (see FIG. 2), the transmission is asynchronous, at the network frequency of 16 or 32 KHz. The output of the DE portion over the Tri-Tac/MSE network, as discussed, is asynchronous, but synchronized to the line frequency clock.

As discussed, prior to the present invention, data was sent from one DNVT to another DNVT either synchronously with line frequency (with flags being sent when there is no data) or asynchronously at low baud rate and randomly with line frequency. In the invention, the data bytes are also sent asynchronously, but at a baud rate that is the same as and synchronized with the line frequency (16 KHz or 32 KHz). Therefore, the baud rate is synchronized twice, once between two DNVTs and once instantaneously by the UART 50 in the CP portion of the TTA. As discussed, this results in unique advantages, specifically, double synchronization increases the reliability of the communication, and the hardware and the software are reduced and simplified because the asynchronous process is easier to implement than the synchronous one, and this also increases equipment reliability.

Additionally, host processors can communicate at different rates over their respective RS232 ports 18 without error. In the prior art method in which the lower baud rate signal is synchronized with the network frequency, because the baud rate from the host processor is not a sub-multiple of the network frequency (16 or 32 KHz), inaccuracies can result when the low baud rate signal is synchronized to the clock. This is because the clock may "clip" or shorten a portion of the width of a pulse from the host processor to synchronize it. At the receiving end, the shortened pulse may not be recognized, leading to communications errors.

As shown in FIG. 2, UART 50 receives and transmits data to the host processor 15 via an RS232 port at a rate between 1200 and 9600 baud. Since this rate is not a sub-multiple of the network frequency of 16 KHz or 32 KHz, a random access memory (RAM) 56 is disposed between the UART 50 and the USART 62. Data coming slowly from UART 50 on line 51 is loaded into the RAM 56 under control of microcomputer 58. The data from the RAM 56 is taken out more quickly at the network frequency of 16 KHz or 32 KHz, and placed on the bus 39 by USART 62. The RAM 56, of course, is necessary to buffer this rate change, as will be evident to those of skill in the art. USART 62 places the data from RAM 56 under control of microcomputer 58 onto bus 39 at the network frequency rate. The data is arranged in the asynchronous format shown in FIGS. 3 and 4, with special bytes indicating the start of each frame and including interframe periods, as previously discussed, or alternatively in the format shown in FIG. 3A. The data on the bus is supplied to the control gate array 72, which under the control of microcontroller 70, provides the data to transmit amplifier 78 and isolation/impedance matching transformer 82 at the network frequency. The data supplied to the network is in asynchronous format, i.e., is organized as shown in FIGS. 3 and 4 into frames with header byte information denoting the start of each frame, or with start and stop bits as shown in FIG. 3A, but it is synchronized to the clock frequency of the network.

When the TTA of the invention receives data, it is receiving data from another TTA according to the invention. Thus, the data is in asynchronous format but synchronized to the network frequency. The control gate array places the data on bus 39. USART 62 supplies the data at the 16 or 32 KHz rate to RAM 56. The data is supplied by RAM 56 under control of microcomputer 58 at the slower 1200 to 9600 baud rate to UART 50, which thereafter supplies the data in the RS232 protocol, under control of microcomputer 58, to the host processor 15. The RAM 56, as is evident to those of skill in the art, is used to buffer the rate change from the higher network frequency to the lower rate employed by the computer 15 over the RS232 line.

In addition to the control of the UART 50, RAM 56 and USART 62, microcomputer 58 also controls other standard functions, including host interface control 52, which is used by UART 50 to control the "handshake" protocol employed by the RS232 line. Additionally, microcomputer 58 controls the data port interface control 64. The data port interface control 64, as discussed previously, among other functions, transmits the dial state indication signal indicating that the host computer 15 should dial out via the host interface control 52.

State Diagram

Figure 8:
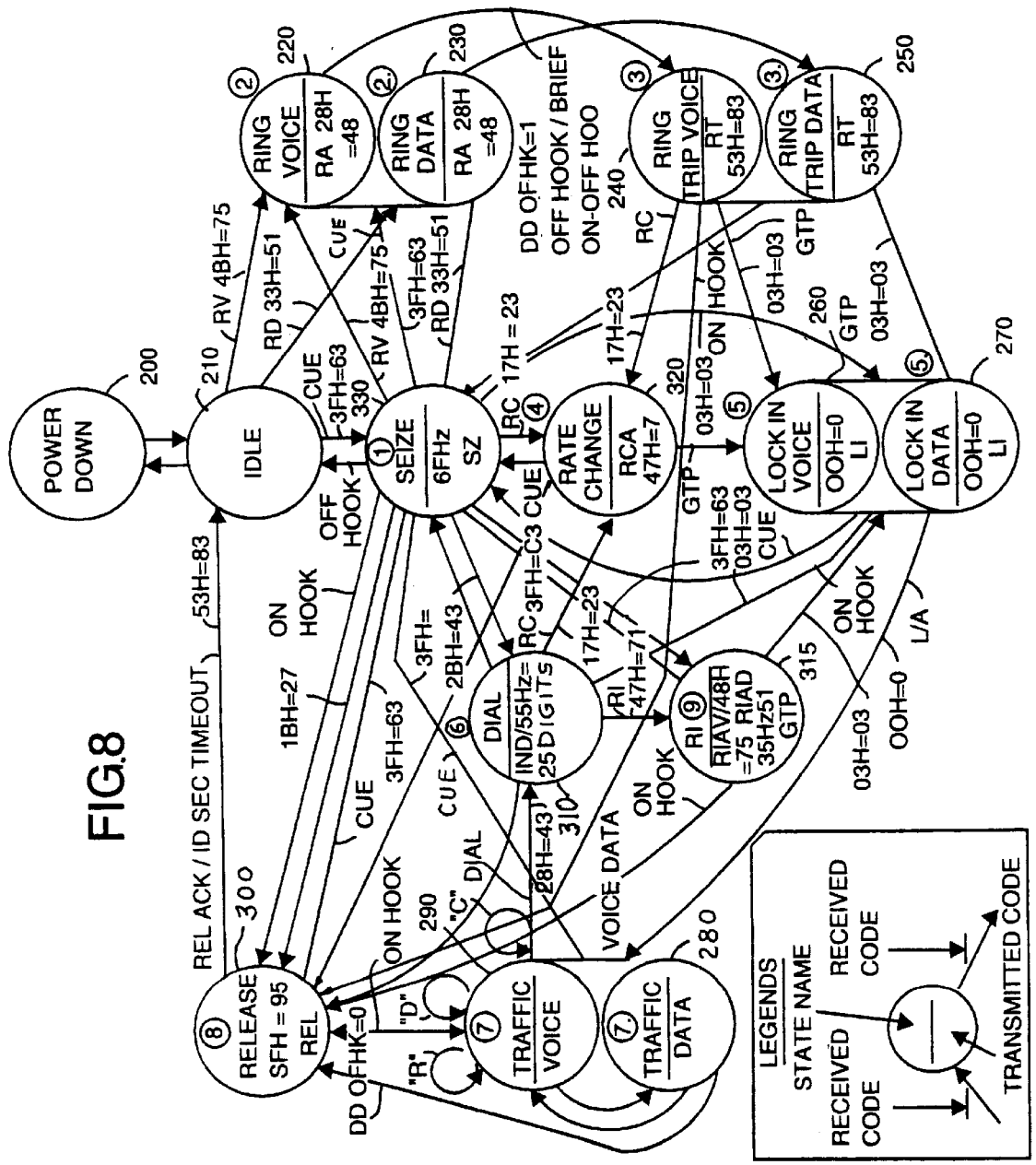
FIG. 8 is a state diagram of the digital emulator portion of the communications interface of the present invention.

FIG. 8 is the state diagram for the DE portion of the TTA. The system includes a number of states, POWER DOWN 200, IDLE 210, RING VOICE 220, RING DATA 230, RING TRIP VOICE 240, RING TRIP DATA 250, LOCK-IN VOICE 260, LOCK-IN DATA 270, TRAFFIC DATA 280, TRAFFIC VOICE 290, RELEASE 300, DIAL 310, RI 315, RATE CHANGE 320 and SEIZE 330. These states will now be described in greater detail.

POWER DOWN 200 is the state that the TTA is in when the system is powered down. When powered up, the system proceeds to the IDLE state 210.

The IDLE state 210 is the quiescent state of the TTA when it is not receiving or transmitting data and has only been powered up. To transfer out of the IDLE state, the system either goes off-hook, or receives a CUE signal from the network, which transfers the system from the IDLE state to the SEIZE state 330. If data is to be transmitted, the network will notify the TTA by sending a DIAL state indication signal, transferring the system to the DIAL state 310. From the DIAL state 310, the system will be transferred by a command from the network transferring the system to the LOCK-IN states, either LOCK-IN VOICE 260 or LOCK-IN DATA 270. From the LOCK-IN state, the transfer is then made to the TRAFFIC states, either TRAFFIC VOICE 290 or TRAFFIC DATA 280. At this point, the TTA is able to transmit and receive data from the network. As shown, from any of the states DIAL, LOCK-IN or TRAFFIC, the transfer can be made via the CUE command from the network, to the SEIZE state.

As shown in FIG. 8, from the TRAFFIC states 280 or 290, if the system goes back on-hook, transfer is to the RELEASE state 300, and in the normal course, from the RELEASE state back to the IDLE state 210. The CUE command will transfer the system from the RELEASE state 300 to the SEIZE state 330.

If the system according to the invention is to receive information, a signal RV for RING VOICE or RD for RING DATA will be received from the network. Transfer is then made to the RING states, RING VOICE 220 or RING DATA 230. Transfer to the RING states can be either from IDLE state 210 or from SEIZE state 330. Once the system goes off-hook, transfer is made to the RING TRIP VOICE state 280 or RING TRIP DATA state 250, which is a ring acknowledge state. From the RING TRIP states 240 or 250, transfer is made to the LOCK-IN states 260 or 270, as appropriate. From the LOCK-IN states, transfer is to the TRAFFIC state, at which communication takes place.

Two other states need to be discussed, the RING INTERROGATION (RI) state 315 and the RATE CHANGE state 320. The RING INTERROGATION state can be reached either from the DIAL state or the SEIZE state, and the RING INTERROGATION state is entered upon a suitable command from the network. In response to RING INTERROGATION, the system will indicate to the network whether it is in voice or data mode. From the RI state, transfer can then be made to the RELEASE state 300, the LOCK-IN states 260 or 270 (if information is to be communicated) or to the SEIZE state 330. As indicated, transfer from any state (except POWER-DOWN) can be made to the SEIZE state by receipt of CUE.

The RATE CHANGE state 320 is a state which is entered in order to change the communication rate, from 32 KHz to 16 KHz, at the request of the network. As discussed, a jumper on the CP board determines the default rate. The actual rate change is performed after transfer via the lock-in state 260 or 270 to the TRAFFIC state 280 or 290. After the communication is completed, a return is made again to the default line rate.

As discussed, the system can reach the SEIZE state from any state except POWER-DOWN. Likewise, the system can return to any other state from the SEIZE state on the receipt of the proper code command.

The TTA according to the invention operates in either one of two operational states, the local command state or the on-line state. When power to the TTA is turned on, it assumes the local command state where local commands can select particular duplex operation, set parameter registers and accept the dial or answer commands that move the TTA to the on-line state. When in local command state, the TTA executes the local commands entered on the PC keyboard by the PC program control and returns a confirming result code when execution is completed.

The on-line state occurs when the TTA originates a call or accepts an incoming call. When on-line, the TTA will not execute local commands. When the TTA is in the on-line state, and the operator wants to issue a command, the TTA must first be returned from on-line to the local command state by using an escape code sequence. When the command is completed, return to on-line state is performed by issuing a command known as the zero command, to be described below. This transfer is completed without the DE portion or the external DNVT/DSVT leaving the TRAFFIC state. For example, when in an on-line state, and the operator wants to transfer to a local command state, change from half to full duplex operation and then return to on-line state without leaving TRAFFIC state, the operator issues on escape code sequence, then the commands AT, F1, 0 and carriage return on the host processor keyboard. The zero command is effective only in TRAFFIC state, as shown in FIG. 8. The commands will be explained in greater detail below.

Figure 9:
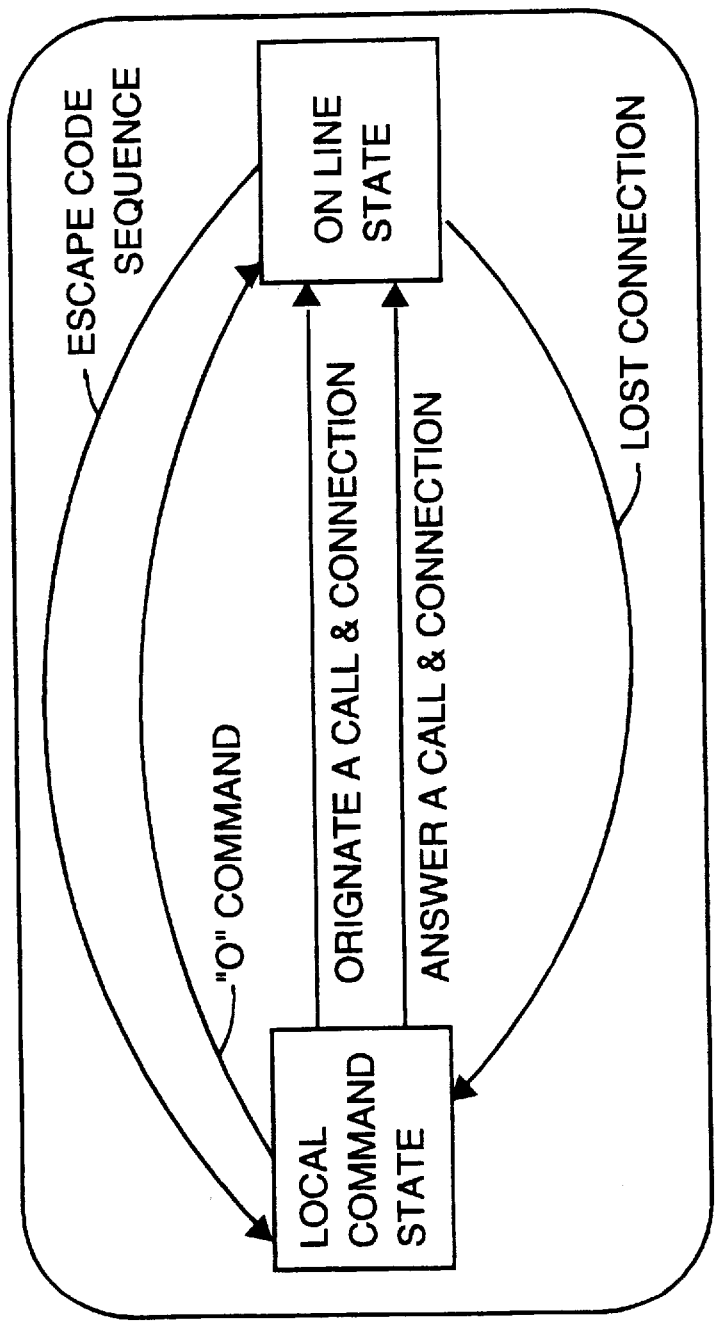
FIG. 9 shows how the communication interface according to the present invention changes state from local command state to on-line state.

Intentional or unintentional loss of connection (the DE portion or external DNVT/DSVT changing from TRAFFIC to IDLE state) also causes the TTA to automatically return to local command state. FIG. 9 illustrates the paths that the TTA may take in moving between local command and on-line states.

Command Set

The command set for the system according to the invention is as follows:

AT COMMAND

Unless otherwise specified in the communications program used by the host processor, all command strings must begin with AT, the attention code. In order for the TTA to begin executing, the command string must be terminated by a carriage return.

A COMMAND

This command causes the TTA to answer a telephone call without waiting for a ring. When the DNVT Emulator or the external DNVT/DSVT changes from the IDLE state to the RING (VOICE or DATA) state, it sends a result code "ring" to the communication processor portion (CP) of the TTA. If the A command is sent prior to the CP receiving the result code "ring", the CP will do a Data Off-Hook immediately.

A/COMMAND

This command instructs the TTA to redial the last telephone number. This telephone number remains in the telephone number buffer until a Ds command is given.

Ds COMMAND

This command instructs the TTA to originate a call, where "s" equals the string of digits of the telephone number to be dialed or the dialing number combined with other commands. This will be explained in greater detail below.

En COMMAND

This command instructs the TTA as to whether it will echo back to the host processor every character sent to it when in the command state. Parameters: n=0 or n=1.

n=0, the TTA does not echo characters in the command state.

n=1, the TTA echoes back all characters in the command state.

Default is n=0.

Fn COMMAND

This command instructs the TTA as to whether it will operate in half or full duplex when On-Line. Parameters: n=0 or n=1.

n=0, half duplex, the TTA echoes transmitted characters back to the host processor.

n=1, full duplex, the TTA does not echo transmitted characters back to the host processor.

Default n=1, full duplex.

Hn COMMAND

This command instructs the TTA to go to Data On-Hook or Data Off-Hook. Parameters: n=0 or n=1.

n=0, go data on-hook (hang up).

n=1, go data off-hook.

Default n=0, data on-hook.

O COMMAND

The O command is used to return the TTA back to the On-Line state after it has been moved to the Local command state by an Escape Code sequence. The DNVT Emulator or external DNVT/DSVT remain in TRAFFIC state during and after transfer. This will be explained in greater detail below.

Sr=n COMMAND

This command assigns a value to any of thirteen S parameter registers. Parameters: r=0 . . . 12, n=0 . . . 255. These will be explained in greater detail below.

Xn COMMAND

This command selects the result code set, described below. Parameters: n=0 or n=1.

n=0, basic result code set is selected.

n=1, extended result codes is selected.

Default n=0, basic result code set. The result codes will be described in greater detail below.

Z COMMAND

This command causes a software reset and applies all default values to the parameter registers S as if the TTA power was disconnected and then reapplied. All Hayes commands not applicable to the TTA such as Cn, In, Mn, Qn, Sn and Vn will be ignored and no error results code sill be returned to the host processor.

Result Codes

Following the completion of the execution of a command, the TTA sends a result code back to the host processor. For example, when the digital switch changes the TTA state from IDLE to RING or from RING to TRAFFIC, this information in the form of a result code is returned to the host processor. Preferably these result codes are in English word form and are preceded and followed by a carriage return/line feed sequence.

There are two sets of result codes, basic and extended, and these differ only in CONNECT code (see below). The Xn command (n=0 for basic and n=1 for extended) selects which set is used in operation.

The basic and extended result codes and their meanings are summarized in Table 1 and Table 2.

TABLE 1

Set of Basic Result Codes
BASIC RESULT CODES

| CODE | MEANING |
| --- | --- |
| OK | Command executed or ignored without error. |
| CONNECT | TTA changed to TRAFFIC state. |
| RING | TTA changed to RING state. |
| NO CARRIER | TTA changed to IDLE state. |
| ERROR | Error in command string |

TABLE 2

Set of Extended Result Codes
EXTENDED RESULT CODES

| CODE | MEANING |
| --- | --- |
| OK | TTA changed to TRAFFIC state and connected to the PC at 1200 baud. |
| CONNECT 1200 | Same as above with a 2400 baud rate. |
| CONNECT 2400 | Same as above with a 2400 baud rate |
| CONNECT 4800 | Same as above with a 4800 baud rate. |
| CONNECT 9600 | Same as above with a 9600 baud rate. |
| RING | TTA changed to RING state. |
| NO CARRIER | TTA changed to IDLE state. |
| ERROR | Error in command string. |

Changing Functional States by Escape Code Sequence

An Escape Code sequence is used to force the TTA back to the Local command state from the On-Line state. The Escape Code sequence should be selected to enable the TTA to distinguish it from transmitted data. This is done by using Escape Guard times. The Escape Code sequence consists of an Escape Guard time followed by three consecutive escape characters and then another Escape Guard time.

To perform the Escape Code sequence with the default values:

Wait at least one second after the last transmittal character.

Enter +++, the escape characters.

Wait at least one second before transmitting another character.

When the TTA returns from the On-Line state to the Local command state, it returns the results code OK to the PC. The DNVT Emulator or external DNVT/DSVT will continue in the TRAFFIC state and will not disconnect unless it receives the command AT M O (hang up) or if the connection is lost.

If the operator wants to change the default value of the escape character+and the guard time, it can be accomplished by resetting the parameter registers S2 and S12 as described below. In any case the Escape Character must be repeated three times and be preceded and followed by a time period longer than the Escape Guard time.

Parameter Setup

There are thirteen parameter registers numbered S0 through S12, which control certain variables for the TTA. These are provided in the control gate array.

Several of them; S1, S3, S4, S5, S9 and S10 are not applicable to the TTA. The list of registers, their default values and descriptions are given in Table 3.

TABLE 3

Parameter Registers

| REGISTER | RANGE | UNITS | DEFAULT | DESCRIPTION |
| --- | --- | --- | --- | --- |
| S0 | 0 . . . 255 | sec | 2 | Ring to answer on. |
| S1 | | | | Not applicable. |
| S2 | 0 . . . 127 | ASCII | 43 | Escape code character. |
| S3 | | | | Not applicable. |
| S4 | | | | Not applicable. |
| S5 | | | | Not applicable. |
| S6 | 0 . . . 255 | sec | 2 | Wait time for dial tone (after off hook). |
| S7 | 0 . . . 255 | sec | 255 | Wait time for connect (after dialing). |
| S8 | 0 . . . 255 | sec | 1 | Pause time (caused by comma). |
| S9 | | | | Not applicable. |
| S10 | | | | Not applicable. |
| S11 | 0 . . . 255 | 10 msec | 20 | Duration and spacing of key presses. |
| S12 | 0 . . . 255 | 20 msec | 50 | Escape code guard time. |

Changing a Parameter To set or change a parameter, the command Sr=n is used where r is the register number and n is the assigned value.

The command S0=n determines the number of seconds in which the TTA answers calls. Setting S0 to 1 through 255 places the TTA in auto-answer mode. Setting S0 to 0 disables auto-answer.

Default=2 seconds.

The command S2=n selects the Escape code character.

Default=ASCII character 43 or "+".

The command S6=n determines how long the TTA waits after the data off-hook before it actually dials the first digit of the telephone number. This delay allows the Switch Board to be set up and the dial tone to be transmitted.

Default=2 seconds.

The command S7=n determines how long the TTA waits for the Connection before hanging up. If the connection does not occur within the specified time period, it hangs up and returns a NO CARRIER result code. If the connection occurs, it goes to the On-Line state and returns the CONNECT (or CONNECT xxxx) result code. Care should be taken here because almost all communications software has its own Wait-for-connection time-out. If this is the case, S7 should be set long enough so as not to interfere with the software. Setting S7=0 causes the TTA to wait for a connection indefinitely.

Default=255 seconds.

The command S8=n determines the pause time caused by the comma in the dial string.

Default=1 second.

The command S11=n sets the duration of the key presses and the pause time between them. The minimum length for reliable dialing is 100 msec (5 digits per second).

Default=20 (200 msec).

The command S12=n sets the Escape Guard time.

Default=50 (seconds).

Auto Dialing

Using the host processor's communications software (e.g. Hayes) any of the 16 digits appearing on the TTA key pad 28 can be used for dialing a phone number on the host processor's keyboard.

Auto-dial, auto-answer and data communication is normally performed with the associated host processor and its communication software. At the operator's option, however, the TTA can be manually operated as a DNVT by dialing from its own keypad 28 or receiving a call and voice communicating with the handset 19 and then switching to data mode for data communications.

The Ds command sets the TTA to originate mode to dial a number. The s is a character string representing the telephone number to be dialed. In addition to the digits and symbols on the TTA keypad 28, the string s may contain the following characters (all but one ignored by the TTA):

| | | |
|---|---|---|
| ■ | T | ignored |
| ■ | P | ignored |
| ■ | R | ignored |
| ■ | : | ignored |
| ■ | space | ignored |
| ■ | ( | ignored |
| ■ | ) | ignored |
| ■ | - | ignored |
| ■ | comma | causes a pause of duration set by the value of register S8. |

The effective length of the string s (formed by those characters not ignored by the TTA) may not exceed 24.

The Ds command must be the last command in the command string and the string s must be terminated by the carriage return.

Example: AT DT 1,,(201)868-4800(cr) dial digit 1, pause for 2 seconds, then dial number 2018684800

Example: AT D S 0, 756-1169(cr) dial digit S, dial digit 0, pause for 1 second, then dial number 7561169.

The symbols T,(,),— were ignored.

Timing Parameters

Timing parameters in the dialing sequence are set by the values assigned to registers in the TTA. The functions of these registers and their default values are listed in Table 4.

TABLE 4

Timing Parameter Registers

| REGISTER | FUNCTION | DEFAULT VALUE |
|---|---|---|
| S6 | Wait time for dial tone. | 2 sec. |
| S7 | Wait time for the connection (after dialing). | 255 sec. |
| S8 | Pause time (caused by comma in the dial string). | 1 sec. |
| S11 | Duration and spacing of key presses. | 0.2 sec. |

The Sr=n command is used to change the values assigned to these registers. For example, if there is difficulty dialing the number because it is too fast, then the value of the S11 register can be increased.

Auto Answering

The S0 register sets the duration of the ring, if any, that must occur before the TTA answers a call. The register may range in value from 0 to 255.

| | |
|---|---|
| S0 = 0 | Do not answer telephone. |
| S0 – 1 | Answer after 1 second. |
| S0 = 2 | Answer after 2 seconds. |
| S0 = 3 | Answer after 3 seconds. |
| . | |
| . | |
| . | |
| S0 = 255 | Answer after 255 seconds. |

When the register is set to 0, the auto-answer option is disabled.

When the power is turned on, the register S0 is set to the default value; S0=2.

The S0 register can be set to the desired value using the Sr=n command. For example, to have the TTA ring 4 seconds before answering the call, the following would be entered: AT S0=4(cr).

As long as power to the unit remains on, the TTA will answer the telephone call of the current state of the register S0. When power to the TTA is turned off and then on again, or a Z (reset) command is given, the TTA returns to the default value of the register S0.

The A Command

In certain circumstances, it the TTA should answer a ring of the incoming call immediately, the A command should be given. Thus; AT A(cr).

Whenever the DNVT Emulator or the external DNVT/DSVT changes state from IDLE to RING, the TTA will perform a Data Off-Hook immediately to answer the call.

Special Operating Modes

There are two special operating modes that the TTA will enter by setting the corresponding configuration switches. When the power is turned on, the TTA examines these switches, and if any of them are set to the ON position, it will jump to the corresponding mode.

Level Converter Mode

This mode enables the TTA to behave as if it is a Level Converter Cable.

The RS-232C transmit signal (+12 V,–12 V) from the host processor will be converted to CMOS level (0 v,+5 V) and sent to a pin (TXDPT) on the Data Port of the DNVT Emulator or external DNVT/DSVT.

Conversely, the CMOS signal (0 V,+5 V) from a pin (RXDPT) of the Data Port will be converted to RS-232C level (+12 V,–12 V) and sent to the host processor as a receive signal.

To operate in the Level Converter Mode, the Local command state must first be entered and then Configuration Switch 5 (on rear panel) must be set to the ON position. The TTA will jump immediately to the Level Converter mode. To exit the Level Converter mode, Configuration Switch 5 must be reset to the OFF position and the TTA will jump back to the Local command state.

Test Mode

This mode is provided to test the TTA directly in a back to back connection.

In order to connect two TTAs back to back, the four wire terminals of the two TTA equipments are interconnected so that the REC terminals of one are connected to the XMT terminals of the other and vice versa.

To operate in Test Mode, the Configuration Switch 6 is set to the ON position.

If Configuration Switch 4 (Voice/Data default) is set to OFF position when the power is turned on, the DNVT Emulator will jump into the TRAFFIC state, ready for voice communication with the other TTA. The TTA still receives commands from the host processor.

Conversely, if Configuration Switch 4 is set to the ON position when the power is turned on, the TTA will jump to the On-Line state with the DNVT Emulator in TRAFFIC state, ready for data communication with the other TTA. The TTA will not receive commands from the host processor unless the Escape code sequence is sent in order to exit the On-Line state and return to the Local command state beforehand.

Due to the phase lock loop in both TTA equipments, it may be necessary to turn OFF and then ON the power switch several times in order to lock their line frequencies to each other.

Special Mode Priority

The Level Converter Mode has priority over the Test Mode. If both Configuration Switches 4 and 5 are set to the ON position, the TTA will enter the Level Converter Mode.

Line Rate Selector Configuration

A selector is provided to allow the selection of a default line rate of either 16 kHz or 32 kHz for the DNVT Emulator. The selector may comprise a jumper. When the jumper is not shorted, the default line rate is 16 kHz, and when shorted, 32 kHz. The TTA can be switched from the default rate to the other rate by receipt of a proper code command from the network as discussed with reference to the state diagram of FIG. 8.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. Apparatus for providing communication between two computers over a communications network and for detecting a command word received from the network for interrupting communication, the command word being repeated for a predetermined time, the apparatus comprising:

first means for organizing data transmitted onto the network in asynchronous format such that the data is arranged in frames with a flag designating the start and stop of each frame and having an interframe period between each frame during which data is not transmitted, each frame having a time period less than the predetermined time of transmission of the command word so that the command word will be transmitted, at least in part, during the interframe period;

second means coupled to the first means and responsive to the command word for interrupting communication; and third means coupled to the second means and responsive to the flag for placing the second means in a disabled state for the time period of each frame so that the second means cannot respond to the command word during a frame, and when the time period is complete, for enabling the second means to respond to the command word during the interframe period when data is not transmitted in order to avoid misinterpreting data as the command word.

2. The apparatus recited in claim 1, wherein the third means comprises counter means for counting a predetermined number of bytes of data in each frame and when the count is terminated after the predetermined number, for enabling the second means to respond to the command word during the interframe period.

3. The apparatus recited in claim 1, wherein the second means is responsive to the command word only after having received a predefined number of repetitions of said command word during the interframe period.

4. The apparatus recited in claim 1, wherein said second means comprises a comparator for comparing said received command word to prestored data corresponding to the command word and for generating a signal indicating a comparison has been made during the interframe period.

5. The apparatus recited in claim 4, wherein said comparator comprises a control gate array.

6. The apparatus recited in claim 1, wherein the communications network is a synchronous network.

7. The apparatus recited in claim 6, wherein the communications network comprises a voice/digital data network.

8. The apparatus recited in claim 7, wherein the communications network comprises the MSE or Tri-Tac network.

9. The apparatus recited in claim 7, further comprising a voice handset coupled to said second means.

10. A method for providing communication between two computers over a communications network and for detecting a command word received from the network for interrupting communication, the command word being repeated for a predetermined time, the method comprising:

organizing data transmitted onto the network in asynchronous format such that the data is arranged in frames with a flag designating the start and stop of each frame and having an interframe period between each frame during which data is not transmitted, each frame having a time period less than the predetermined time of transmission of the command word so that the command word will be transmitted, at least in part, during the interframe period;

transmitting the command word so that the command word occurs, at least in part, during the interframe period;

detecting the flag;

disabling detection of the command word in response to detecting the flag for the time period of each frame so that the command word cannot interrupt communication during a frame;

enabling detection of the command word during the interframe period when the frame time period is complete;

detecting the command word during the interframe period; and interrupting communication when the command word is detected in the interframe period when data is not transmitted in order to avoid misinterpreting data as the command word.

11. The method recited in claim 10, wherein the step of disabling comprises counting a predetermined number of bytes of data in each frame and maintaining disablement of detection of the command word until the count is terminated after the predetermined number, said step of enabling comprising enabling detection of the command word during the interframe period.

12. The method recited in claim 10, wherein the step of interrupting occurs only after a predefined number of repetitions of said command word are received during the interframe period.

13. The method recited in claim 10, wherein said step of detecting the command word comprises comparing said received command word to prestored data corresponding to the command word and generating a signal indicating a comparison has been made during the interframe period.

14. The method recited in claim 10, wherein the communications network is a synchronous network.

15. The method recited in claim 14, wherein the communications network comprises a voice/digital data network.

16. The method recited in claim 15, wherein the communications network comprises the MSE or Tri-Tac network.

17. The method recited in claim 16, further comprising communicating with a voice handset over the network.

18. A method for providing communication between a computer and a communications network, comprising:

transmitting a digital dial state indication signal from the network to the computer for informing the computer that voice communication can be initiated;

detecting the digital dial state indication signal from the network and generating a digital control bit indicating the presence of said digital dial state indication signal and thus that the network is ready to allow communication with the computer;

providing said digital control bit to dialing means coupled to the computer, said dialing means being responsive to said digital control bit so as to dial a telephone number; and automatically dialing said telephone number for transmission over said network to initiate digital data communication with another computer coupled to said network in response to said control bit.

19. The method recited in claim 18, wherein said step of detecting comprises comparing said received digital dial state indication signal to prestored data corresponding to said digital dial state indication signal and generating a signal indicating a comparison has been made.

20. Apparatus for providing communication between two computers over a communications network and for detecting a command word received from the network for interrupting communication, the command word being repeated for a predetermined time, the apparatus comprising:

first means for organizing data transmitted onto the network in asynchronous format such that the data is arranged between start and stop bits with periods of no data between stop and start bits;

second means coupled to the first means and responsive to the command word from the network for determining if a predetermined number of said command words are received during a defined number of contiguous bytes of said data; and third means coupled to the second means and responsive to receipt of said predetermined number of said command words in said defined number of contiguous bytes for interrupting communication when said predetermined number of said command words are detected in the defined number of contiguous bytes.

21. The apparatus recited in claim 20, wherein the second means comprises counter means for counting the number of command words and said predefined number of contiguous bytes.

22. The apparatus recited in claim 21, wherein said third means comprises means for forming a ratio of the number of command words to said predefined number of contiguous bytes and for generating a signal interrupting communication if the ratio exceeds or equals a prescribed threshold.

23. The apparatus recited in claim 22, wherein the ratio equals approximately 0.9.

24. The apparatus recited in claim 20, wherein said second means comprises a comparator for comparing said received command word to prestored data corresponding to the command word and for generating a signal indicating a comparison has been made.

25. The apparatus recited in claim 24, wherein the comparator comprises a control gate array.

26. The apparatus recited in claim 20, wherein the communications network is a synchronous network.

27. The apparatus recited in claim 26, wherein the communications network comprises a voice/digital data network.

28. The apparatus recited in claim 27, wherein the communications network comprises the MSE or Tri-Tac network.

29. The apparatus recited in claim 27, further comprising a voice handset coupled to said second means.

30. The method recited in claim 20, wherein said step of determining comprises comparing said received command word to prestored data corresponding to the command word and generating a signal indicating a comparison has been made.

31. The method recited in claim 20, wherein the communications network is a synchronous network.

32. A method for providing communication between two computers over a communications network and for detecting a command word received from the network for interrupting communication, the command word being repeated for a predetermined time, the method comprising:

organizing data transmitted onto the network in asynchronous format such that the data is arranged between start and stop bits with periods of no data between stop and start bits;

determining, in response to the receipt of a first command word from the network, if a predetermined number of said command words are received during a defined number of contiguous bytes of said data; and interrupting communication when said predetermined number of said command words in said defined number of contiguous bytes are received.

33. The method recited in claim 32, wherein the step of determining comprises counting the number of command words and said predefined number of contiguous bytes.

34. The method recited in claim 33, wherein said step of interrupting comprises forming a ratio of the number of command words to said predefined number of contiguous bytes and generating a signal interrupting communication if the ratio exceeds or equals a prescribed threshold.

35. The method recited in claim 34, wherein the ratio equals approximately 0.9.

36. The method recited in claim 31, wherein the communications network comprises a voice/digital data network.

37. The method recited in claim 36, wherein the communications network comprises the MSE or Tri-Tac network.

38. The method recited in claim 36, further comprising communicating with a voice handset over the network.

* * * * *